United States Patent
Wakazono et al.

(10) Patent No.: US 8,223,410 B2
(45) Date of Patent: Jul. 17, 2012

(54) IMAGING DEVICE AND METHOD OF PROCESSING IMAGING RESULT IN IMAGING DEVICE

(75) Inventors: Masafumi Wakazono, Tokyo (JP); Hirofumi Hayakawa, Kanagawa (JP); Koichiro Ishigami, Kanagawa (JP); Takami Mizukura, Kanagawa (JP); Naoya Katoh, Chiba (JP); Miyuki Okada, Kanagawa (JP)

(73) Assignee: Sony Corporation (JP)

( * ) Notice: Subject to any disclaimer, the term of this patent is extended or adjusted under 35 U.S.C. 154(b) by 996 days.

(21) Appl. No.: 11/440,567

(22) Filed: May 25, 2006

(65) Prior Publication Data

US 2006/0274386 A1 Dec. 7, 2006

(30) Foreign Application Priority Data

Jun. 1, 2005 (JP) ................. 2005-160841

(51) Int. Cl.
*G03F 3/08* (2006.01)
*G06T 15/00* (2006.01)
*G06K 9/00* (2006.01)
*H04N 1/40* (2006.01)
*G09G 5/02* (2006.01)

(52) U.S. Cl. ........ 358/518; 358/448; 345/419; 345/602; 382/167

(58) Field of Classification Search .................. 358/1.9, 358/448, 518; 345/419, 602, 643; 382/167
See application file for complete search history.

(56) References Cited

U.S. PATENT DOCUMENTS

| | | | |
|---|---|---|---|
| 5,428,465 A | 6/1995 | Kanamori et al. | |
| 5,668,596 A | 9/1997 | Vogel | |
| 5,668,890 A | 9/1997 | Winkelman et al. | |
| 5,731,818 A * | 3/1998 | Wan et al. | 345/590 |
| 6,885,382 B1 * | 4/2005 | Matsuzaki et al. | 345/600 |
| 2001/0040588 A1* | 11/2001 | Shiraiwa et al. | 345/690 |
| 2004/0190770 A1* | 9/2004 | Spaulding et al. | 382/167 |
| 2007/0165048 A1* | 7/2007 | Yamashita et al. | 345/601 |

FOREIGN PATENT DOCUMENTS

| | | |
|---|---|---|
| EP | 0 677 972 A2 | 10/1995 |
| EP | 0 891 077 A2 | 1/1999 |
| EP | 1 202 560 | 5/2002 |
| EP | 1 337 105 | 8/2003 |
| EP | 1 538 848 A | 6/2005 |
| EP | 1 667 063 A | 6/2006 |
| JP | 2-087192 A | 3/1990 |

(Continued)

OTHER PUBLICATIONS

Office Action from Japanese Application No. 2009-050028, dated Mar. 6, 2012.

*Primary Examiner* — James A Thompson
(74) *Attorney, Agent, or Firm* — Lerner, David, Littenberg, Krumholz & Mentlik, LLP

(57) ABSTRACT

The present invention relates to an imaging device and a method of processing an imaging result in an imaging device, and is applied to e.g. an electronic still camera to thereby allow the camera to correct image quality readily and flexibly with avoiding the deterioration of the image quality effectively. In the present invention, a three-dimensional look-up table is provided and an imaging result (Y2, Cb2, Cr2) is corrected by use of the three-dimensional look-up table.

31 Claims, 26 Drawing Sheets

FOREIGN PATENT DOCUMENTS

| | | |
|---|---|---|
| JP | 3209402 B2 | 5/1998 |
| JP | 2001111858 A | 4/2001 |
| JP | 2001169135 A | 6/2001 |
| JP | 2001-194238 A | 7/2001 |
| JP | 2002-016818 A | 1/2002 |
| JP | 2002-034051 A | 1/2002 |
| JP | 2002-152530 A | 5/2002 |
| JP | 2002-185804 A | 6/2002 |
| JP | 2002190014 A | 7/2002 |
| JP | 2003-60926 A | 2/2003 |
| JP | 2003-219194 A | 7/2003 |
| JP | 2004-104464 A | 4/2004 |
| JP | 2005-072850 A | 3/2005 |
| JP | 2005064738 A | 3/2005 |
| WO | WO-2004/032524 A | 4/2004 |
| WO | WO-2005/027040 A | 3/2005 |

\* cited by examiner

IMAGING DEVICE AND METHOD OF PROCESSING IMAGING RESULT IN IMAGING DEVICE

CROSS-REFERENCE TO RELATED APPLICATIONS

The present application claims priority from Japanese Patent Application No. JP 2005-160841 filed on Jun. 1, 2005, the disclosure of which is hereby incorporated by reference herein.

BACKGROUND OF THE INVENTION

The present invention relates to an imaging device and a method of processing an imaging result in an imaging device, and can be applied to an electronic still camera for example. The invention employs a three-dimensional look-up table and corrects an imaging result by use of the three-dimensional look-up table, to thereby enable image quality to be readily and flexibly corrected, with the deterioration of the image quality being avoided effectively.

Conventionally, there has been provided an electronic still camera that allows image quality to be variously set according to color mode selection, and thus can offer wide compatibility with imaging environments, user's preferences, etc.

Specifically, in this kind of electronic still camera, image data obtained by an imaging element is subjected to auto white balance adjustment, grayscale correction, and chroma correction, followed by being recorded in a memory card as a recording medium in a format compatible with DCF (Design rule for Camera File System). In the setting of image quality according to the color mode selection, the settings of the grayscale correction and chroma correction are switched.

The grayscale correction is to correct grayscales of image data defined by red, green and blue (RGB) with use of a nonlinear function. In the grayscale correction, e.g., the sense of brightness and the sense of contrast of image quality are operated in order to bring the contrast of an imaging result close to that of actual look of the imaged object. Various configurations relating to the correction have been proposed in e.g., Japanese Patent Laid-open No. 2004-104464. When image quality is set based on a color mode, parameters defining the nonlinear function are changed in the grayscale correction.

In contrast, the chroma correction is processing in which image data based on RGB is converted into image data based on a luminance signal and color difference signals, and then the image data based on a luminance signal and color difference signals is linearly transformed on a color difference plane defined by color difference signals. The chroma correction is applied to tint adjustment and chroma adjustment in which chroma is increased to offer impressive image quality or is decreased to prevent grayscale error. When image quality is set based on a color mode, parameters defining the linear transformation processing are changed in the chroma correction.

Therefore, in an electronic still camera, plural kinds of two groups of parameters relating to the grayscale correction and chroma correction are prepared and recorded according to imaging environments and user's preferences. The selection of a color mode at the time of imaging leads to setting of the corresponding parameters.

However, the processing for adjusting image quality through the grayscale correction and chroma correction problematically involves inadequacy in terms of practical use.

Specifically, when chroma correction is implemented by linear transformation on a color difference plane as described above, lightness is also changed, which problematically deteriorates image quality. This problem is elicited by chroma enhancement accompanied by the corresponding lightness increase. More specifically, although a change of the level of a color difference signal causes no change of a luminance signal, this level change of the color difference signal in the L*a*b* color system, which is a color system close to the perception of a human, problematically leads to a change of the lightness L*. When the gain of a color difference signal is increased by the chroma correction, the lightness L* increases in an area with a high chroma and a low lightness, which spoils the three-dimensional appearance of the imaging result.

As one method to address this problem, a method is possible in which chroma correction is carried out through 3×3 matrix arithmetic of image data made up of red, green and blue signals. However, even this method cannot prevent a change of lightness completely.

In addition, there is another problem that the grayscale correction and chroma correction are processing for converting the entire color space, and therefore involve a difficulty in adjusting only a limited area of the color space. Accordingly, flexible correction of image quality is impossible. For example, adjusting the tint of the red region leads to an unnatural skin color, and operating the tint of the yellow region affects the green region. As a result, adjustment operations for the respective representative colors have an effect on each other, and therefore adequate adjustment of all the representative colors is impossible.

Furthermore, there is also a problem that, although the color space includes both a color that is readily saturated and a color that has a reduced tendency of being saturated, the grayscale correction and chroma correction cannot offer processing in which the existence of these opposite colors is taken into consideration, and thus readily cause the deterioration of image quality due to the color saturation.

As one method to solve, of the above-described problems, the problem relating to the flexibility, a method has been proposed in which a color space to be used in chroma correction is divided into plural areas and processing is executed in the respective divided areas. However, even by this method, a mutual effect between colors having similar hues, such as red and a skin color, and yellow and green, cannot be prevented in practice.

Therefore, these problems arise not only when image quality is adjusted based on a color mode, but necessarily arise when grayscale correction such as gamma correction and chroma correction are executed in an electronic still camera.

As a method to solve these problems collectively, there is a method in which imaging results are recorded and held as files and then are down-loaded to a computer, followed by being subjected to edit processing. However, this method forces a user to implement troublesome operations, and therefore all users cannot use this method easily.

SUMMARY OF THE INVENTION

The present invention is made in consideration of the above-described problems, and an object thereof is to provide an imaging device and a method of processing an imaging result in an imaging device for enabling image quality to be corrected readily and flexibly, with the deterioration of the image quality being avoided effectively.

In order to solve the above-described problems, according to a first embodiment of the invention, there is provided an imaging device that includes an imaging element that outputs an imaging result of an optical image formed on an imaging plane, a lens that forms the optical image on the imaging plane, an image processor that implements color adjustment for the imaging result by use of a three-dimensional look-up table (3D-LUT), and a recorder that records the imaging result processed by the image processor in a recording medium.

According to a second embodiment of the invention, there is provided a method of processing an imaging result in an imaging device. The method includes implementing color adjustment for an imaging result obtained by an imaging element by use of a three-dimensional loop-up table.

According to the first embodiment, only the lightness or the chroma can be corrected, which allows the chroma to be corrected with a change of the lightness being prevented. Furthermore, all the representative colors can be adjusted optimally so that the adjustment operations for the respective representative colors have no effect on each other. In addition, image quality can be corrected without using a computer or the like. These advantages allow image quality to be corrected readily and flexibly with the deterioration of the image quality being avoided effectively.

Thus, the second embodiment can provide a method of processing an imaging result in an imaging device that can correct image quality readily and flexibly with avoiding the deterioration of the image quality effectively.

According to the embodiments of the invention, image quality can be corrected readily and flexibly with the deterioration thereof being avoided effectively.

DETAILED DESCRIPTION

Embodiments of the present invention will be described in detail below with reference to the accompanying drawings.

First Embodiment

1. Configuration of Embodiment

Figure 2:
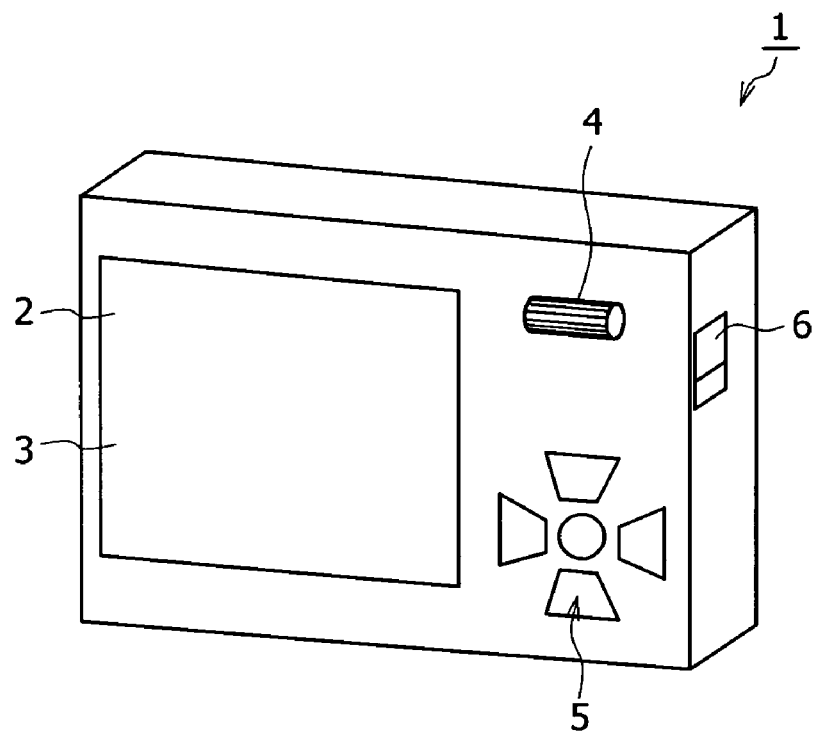
FIG. 2 is a perspective view illustrating the electronic still camera according to the first embodiment.

FIG. 2 is a perspective view illustrating an electronic still camera according to a first embodiment of the invention. The electronic still camera 1 is formed into a rectangular thin plate shape, and has a lens and so forth on the front face thereof. In addition, the electronic still camera 1 has a liquid crystal display 2 for monitoring an imaging result on its backside illustrated in the drawing. A touch panel 3 is provided on the display screen of the liquid crystal display 2. Thus, an item in a menu displayed on the liquid crystal display 2 can be selected through the operation of the touch panel 3. The electronic still camera 1 also has on its backside a rotary operating element 4 that can be pressed, and an operating element 5 for selecting a direction and making a decision. Furthermore, the electronic still camera 1 has a slide switch 6 on its side face. The operation of these operating elements 4 to 6 also permits the acceptance of operations such as menu selection.

Figure 3:
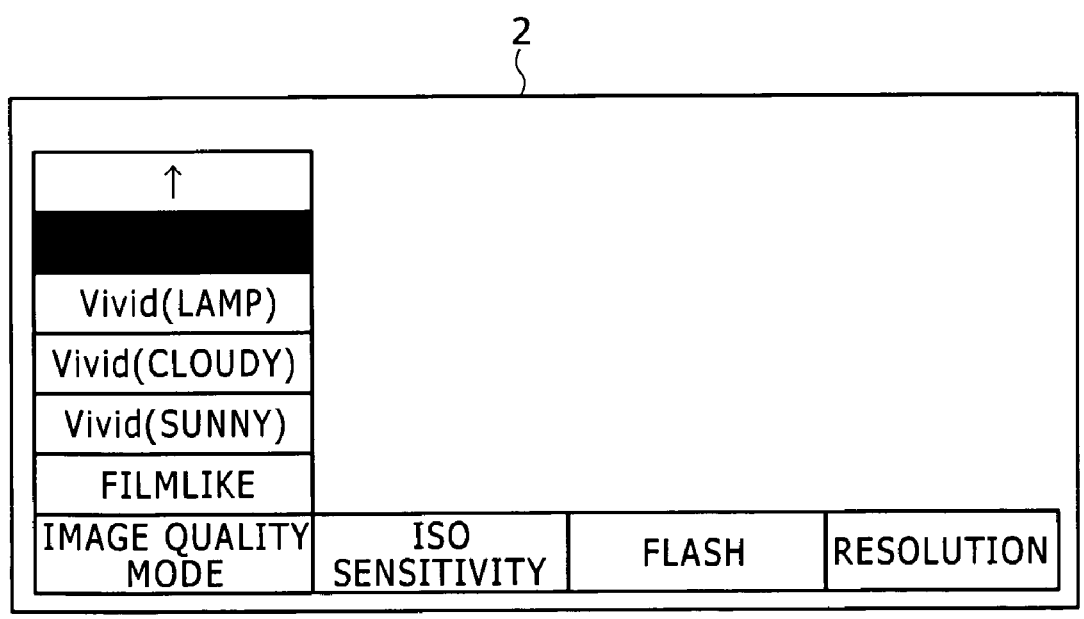
FIG. 3 is a plan view showing a menu screen in the electronic still camera of FIG. 2.

FIG. 3 is a plan view illustrating the indication of a menu for selecting a color mode in association with the operation of the touch panel 3 and the operating elements 4 to 6. The color modes are image quality correction modes according to imaging environments and user's preferences. The electronic still camera 1 displays a menu including items: image quality correction mode (color mode), ISO sensitivity, flash, and resolution. Selecting an item from the menu leads to indication of the corresponding sub menu. FIG. 3 shows the case where the item for image quality correction modes has been selected. A sub menu including portrait, Vivid (lamp), Vivid (cloudy), Vivid (sunny), film like as color modes is indicated. In the electronic still camera 1, a desired color mode can be selected through the selection from this sub menu including these color modes. Thus, a user interface can be made so that image quality can be adjusted more finely compared with the correction of image quality merely by use of white balance adjustment and so on.

Figure 4:
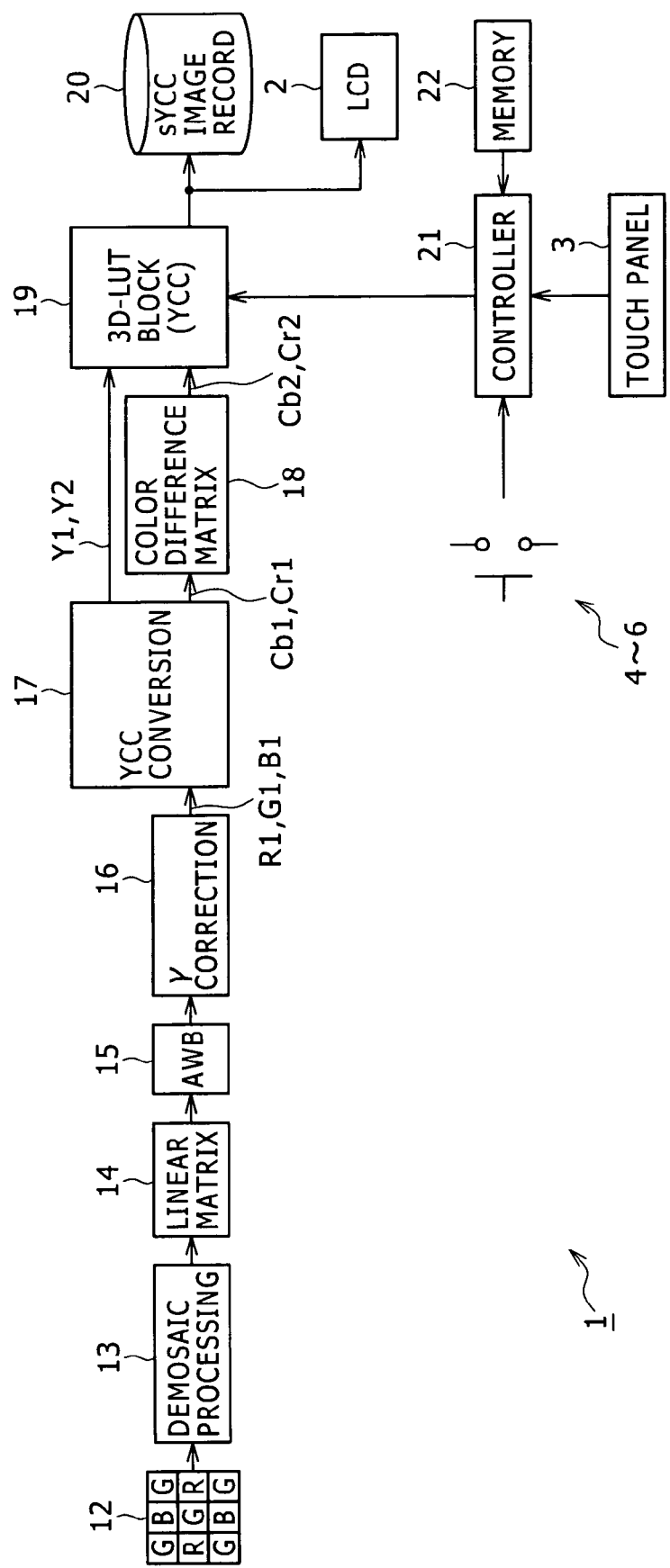
FIG. 4 is a block diagram illustrating the electronic still camera according to the first embodiment.

FIG. 4 is a block diagram illustrating the electronic still camera according to the first embodiment of the invention. In the electronic still camera 1, an imaging element 12 is provided with e.g., a color filter of a primary control system, and outputs an imaging result of an optical image that is formed on the imaging plane through a lens (not shown). The electronic still camera 1 subjects an output signal from the imaging element 12 to correlated double sampling and other processing, and then subjects the resultant signal to analog-to-digital conversion to thereby produce image data defined by primary color signals. The image data is input to a demosaic processor 13.

The demosaic processor 13 executes interpolation processing for this image data to thereby correct the spatial phase of the imaging result corresponding to the color filter provided in the imaging element 12, and output the resultant image data. A linear matrix part 14 executes arithmetic processing of the image data output from the demosaic processor 13 to thereby increase the color purity of the image data and output the resultant image data. An auto white balance adjuster (AWB) 15 implements auto white balance adjustment of output data from the linear matrix part 14, and outputs the resultant data. A gamma corrector (γcorrection) 16 executes gamma correction of the output data from the auto white balance adjuster 15, and outputs the corrected data.

A YCC converter 17 converts the image data (R1, G1, B1) composed of primary color signals output from the gamma corrector 16 into image data (Y1, Cb1, Cr1) defined by on a luminance signal and color difference signals through arithmetic processing in accordance with Equation 1.

Equation 1

$$\begin{bmatrix} Y1 \\ Cb1 \\ Cr1 \end{bmatrix} = M1 \cdot \begin{bmatrix} R1 \\ G1 \\ B1 \end{bmatrix} \quad (1)$$

$$M1 = \begin{bmatrix} 0.2990 & 0.5870 & 0.1140 \\ -0.1687 & -0.3313 & 0.5000 \\ 0.5000 & -0.4187 & -0.0813 \end{bmatrix}$$

A color difference matrix 18 implements matrix arithmetic processing of Equation 2 for, of the image data (Y1, Cb1, Cr1) based on a luminance signal and color difference signals, image data (Cb1, Cr1) defined by color difference signals. Thus, the color difference matrix 18 executes chroma correction processing therefor and outputs image data (Cb2, Cr2) resulting from the processing. In Equation 2, R11, R12, R21 and R22 are transformation factors of the chroma correction processing.

Equation 2

$$\begin{bmatrix} Cb2 \\ Cr2 \end{bmatrix} = \begin{bmatrix} R11 & R12 \\ R21 & R22 \end{bmatrix} \cdot \begin{bmatrix} Cb1 \\ Cr1 \end{bmatrix} \quad (2)$$

A three-dimensional look-up table block (3D-LUT block) 19 corrects the image data (Cb2, Cr2) made up of color difference signals output from the color difference matrix 18 and the image data Y1 defined by a luminance signal output from the YCC converter 17, and outputs the corrected data. An image recorder 20 records image data D3 output from the 3D-LUT block 19 in a recording medium such as a memory card. Therefore, a luminance signal Y2 of image data (Y2, Cb2, Cr2) input to the 3D-LUT block 19 is expressed by Equation 3.

Equation 3

$$Y2 = Y1 \quad (3)$$

The liquid crystal display 2 displays an image for monitoring based on the image data output from the 3D-LUT block 19.

A controller 21 is a unit for controlling the operation of the entire electronic still camera 1, and executes a processing program recorded in a memory 22 to thereby switch the entire operation in response to operations of the touch panel 3 and various operating elements 4 to 6. In this series of processing, when a color mode is selected by a user, the controller 21 sets data for correction (hereinafter, correction data) recorded in the memory 22 in the 3D-LUT block 19 according to this color mode selection. The memory 22 stores a processing program to be executed by the controller 21, and plural kinds of correction data corresponding to color modes included in the electronic still camera 1. When the correction data is thus set in the 3D-LUT block 19, the indication on the liquid crystal display 2 is switched so that the completion of the setting is notified of the user. In the present embodiment, the processing program relating to the 3D-LUT block 19 is provided in the camera 1 by preinstall. Alternatively, the program may be provided through downloading over a network such as the Internet, or may be provided after being recorded in a recording medium-such as an optical disk, a magnetic disk or a memory card.

Figure 1:
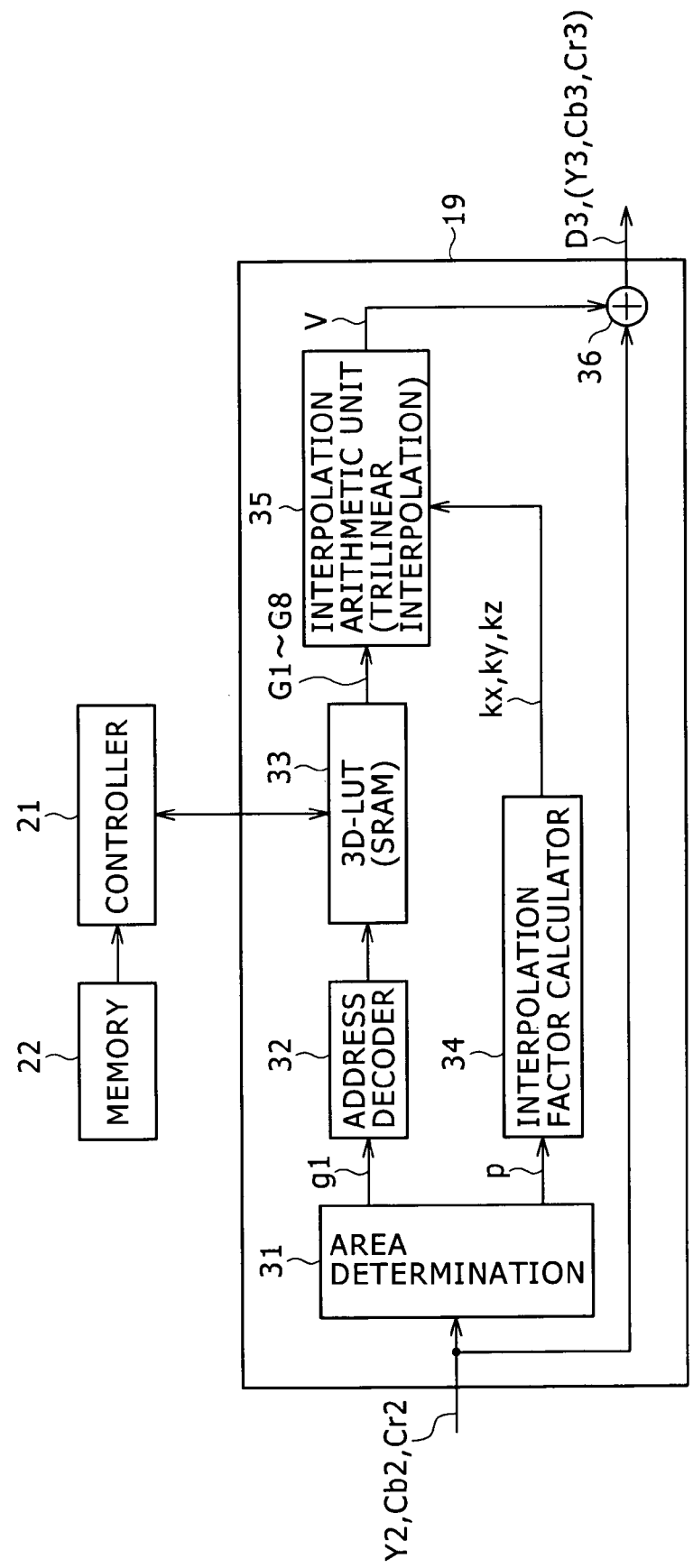
FIG. 1 is a block diagram illustrating a 3D-LUT block of an electronic still camera according to a first embodiment of the invention.
Figure 5:
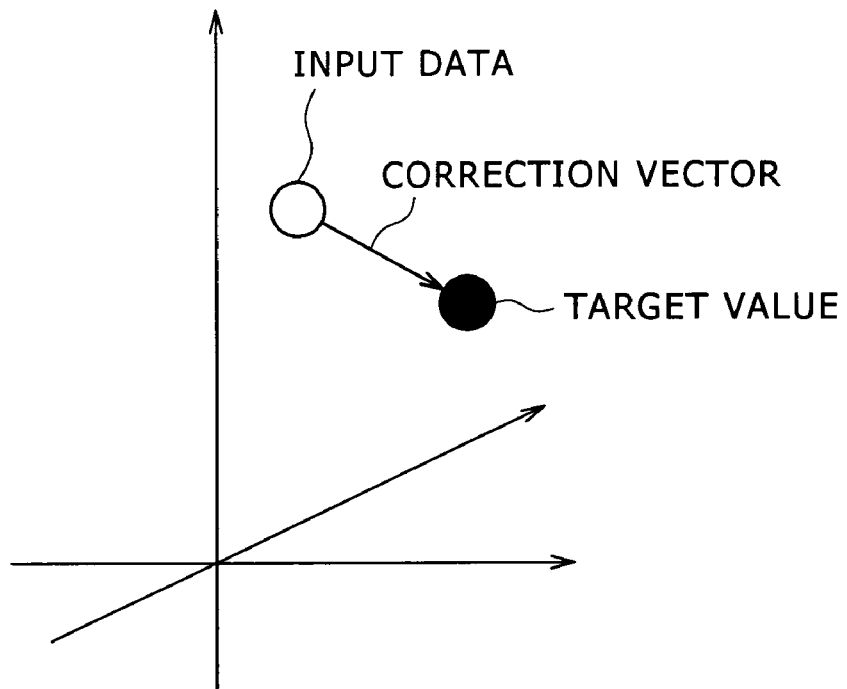
FIG. 5 is a schematic diagram for explaining image quality correction in the electronic still camera of FIG. 2.
Figure 6:
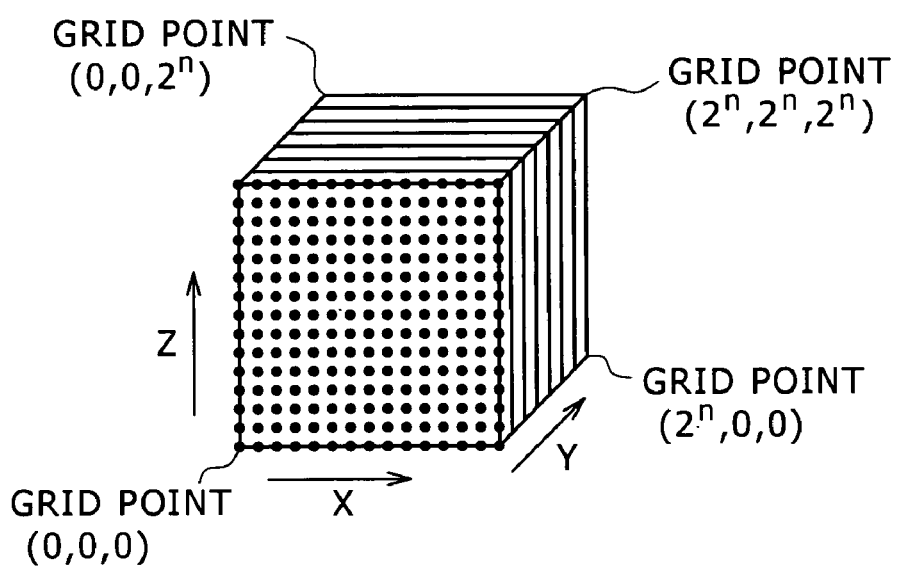
FIG. 6 is a schematic diagram for explaining grid points of the 3D-LUT block of FIG. 1.
Figure 7:
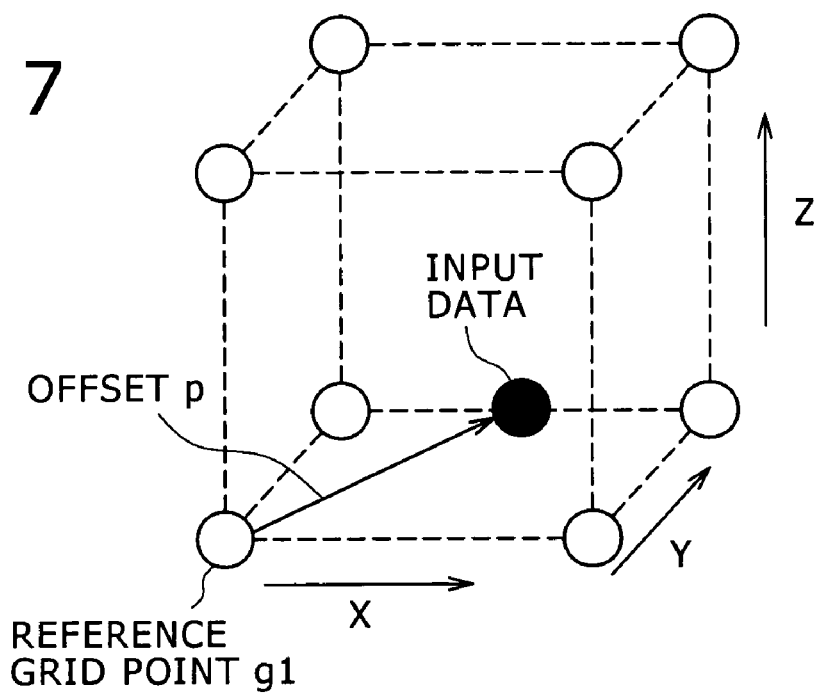
FIG. 7 is a schematic diagram showing the relationship among the grid points of FIG. 6, a reference grid point and an offset.
Figure 8:
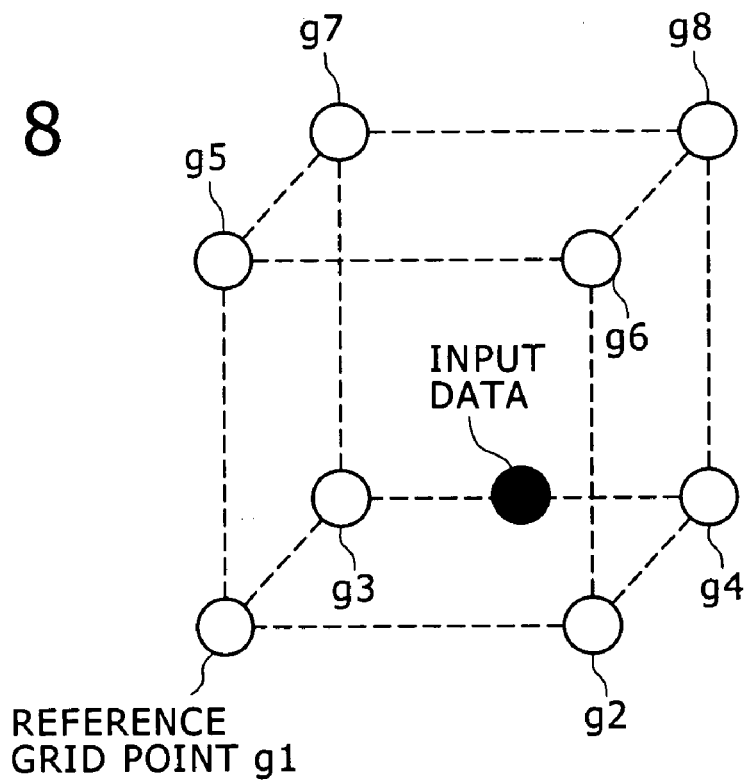
FIG. 8 is a schematic diagram showing the relationship between the grid points of FIG. 6 and input data.

FIG. 1 is a block diagram illustrating the 3D-LUT block 19 together with related configurations. The 3D-LUT block 19 corrects input image data (Y2, Cb2, Cr2) in a color space by use of a correction vector as shown in FIG. 5, and outputs image data D3 with a target value. In the 3D-LUT block 19, grid points arranged in a matrix are set in the color space defined by the input image data (Y2, Cb2, Cr2) as shown in FIG. 6. Correction vectors of the grid points are set depending on a selected color mode under control by the controller 21. As shown in FIGS. 7 and 8, the 3D-LUT block 19 creates a correction vector for the sampling value of the input image data (Y2, Cb2, Cr2) based on correction vectors set for eight grid points surrounding the sampling point of the input image data (Y2, Cb2, Cr2). The 3D-LUT block 19 then corrects the sampling value of the input image data (Y2, Cb2, Cr2) by use of the created correction vector. In the present embodiment, the grid point having the smallest sampling value of the eight grid points around the sampling point of the input image data (Y2, Cb2, Cr2) is defined as a reference grid point g1.

In the 3D-LUT block 19, an area determiner 31 makes a determination as to the sampling value of the input image data (Y2, Cb2, Cr2), to thereby detect the reference grid point g1 for the input image data (FIG. 7). In addition, the area determiner 31 detects an offset p from the reference grid point g1 for the sampling value of the input image data (Y2, Cb2, Cr2). The offset p is a deviation between the sampling value of the input image data (Y2, Cb2, Cr2) and the reference grid point g1.

Specifically, in the present embodiment, grids points are set in the color space defined by the input image data (Y2, Cb2, Cr2) of m bits in such a manner that 2n+1 (n<m) grid points are uniformly distributed on each axis. The area determiner 31 detects the reference grid point g1 from the n most significant bits of the input image data (Y2, Cb2, Cr2), and detects the offset p from the m−n least significant bits thereof, as expressed by Equations 4 and 5.

Equation 4

$$g1 = \left(\left\lfloor\frac{X}{2^n}\right\rfloor \left\lfloor\frac{Y}{2^n}\right\rfloor \left\lfloor\frac{Z}{2^n}\right\rfloor\right) \quad (4)$$

Equation 5

$$p = (X\ Y\ Z) - 2^n \times \left(\left\lfloor\frac{X}{2^n}\right\rfloor \left\lfloor\frac{Y}{2^n}\right\rfloor \left\lfloor\frac{Z}{2^n}\right\rfloor\right) \quad (5)$$

Based on information on the reference grid point g1 detected by the area determiner 31, an address decoder 32 sequentially produces and outputs addresses necessary for access to correction data relating to the eight grid points surrounding the input image data (Y2, Cb2, Cr2). The grid points are recorded in a three-dimensional look-up table (3D-LUT) 33. The coordinates of these eight grid points g1 to g8 are expressed by Equation 6, when the coordinate of the reference grid point g1 is (x, y, z).

Equation 6 g1=(xyz)

g2=(x+1yz)

g3=(xy+1z)

g4=(x+1y+1z)

g5=(xy z+1)

g6=(x+1yz+1)

g8=(y+1z+1) (6)

The 3D-LUT 33 sequentially outputs correction vectors G1 to G8 set for the eight grid points surrounding the input image data (Y2, Cb2, Cr2) in accordance with the address data output from the address decoder 32.

An interpolation factor calculator 34 executes arithmetic processing of Equation 7 with use of the offset p detected by the area determiner 31, to thereby calculate an interpolation factor k=(kx, ky, kz) for creating correction data for the input image data (Y2, Cb2, Cr2) from the correction vectors G1 to G8 that are set for the eight grid points around the input image data (Y2, Cb2, Cr2). Note that n in Equation 7 is m−n described above for Equation 5.

Equation 7

$$k = \frac{p}{2^n} \quad (7)$$

An interpolation arithmetic unit 35 executes interpolation processing for the correction vectors G1 to G8 output from the 3D-LUT 33 with use of the interpolation factor k=(kx, ky, kz) calculated by the interpolation factor calculator 34, to thereby produce a correction vector V for the input image data (Y2, Cb2, Cr2). The present embodiment employs trilinear interpolation processing for this interpolation arithmetic processing, and thus produces the correction vector V based on arithmetic processing in accordance with Equation 8.

Equation 8

$$V=kz^*(S-P)+P \quad (8)$$

S and P in Equation 8 are obtained from Equation 9.

Equation 9

$S=ky^*(R-Q)+Q$ $P=ky^*(N-M)+M$ $M=kx^*(G2-G1)+G1$ $N=kx^*(G4-G3)+G3$ $R=kx^*(G8-G7)+G7 \quad (9)$ An adder 36 adds the correction vector V to the original input image data (Y2, Cb2, Cr2) based on arithmetic processing of Equation 10, and outputs output image data D3 (Y3, Cb3, Cr3). Thus, in the present embodiment, the color difference matrix 18 and the 3D-LUT block 19 form an image processor that implements color adjustment for an imaging result with use of the 3D-LUT 33.

Equation 10

$(Y3Cb3Cr3)=(Y2Cb2Cr2)+V \quad (10)$

Figure 9:
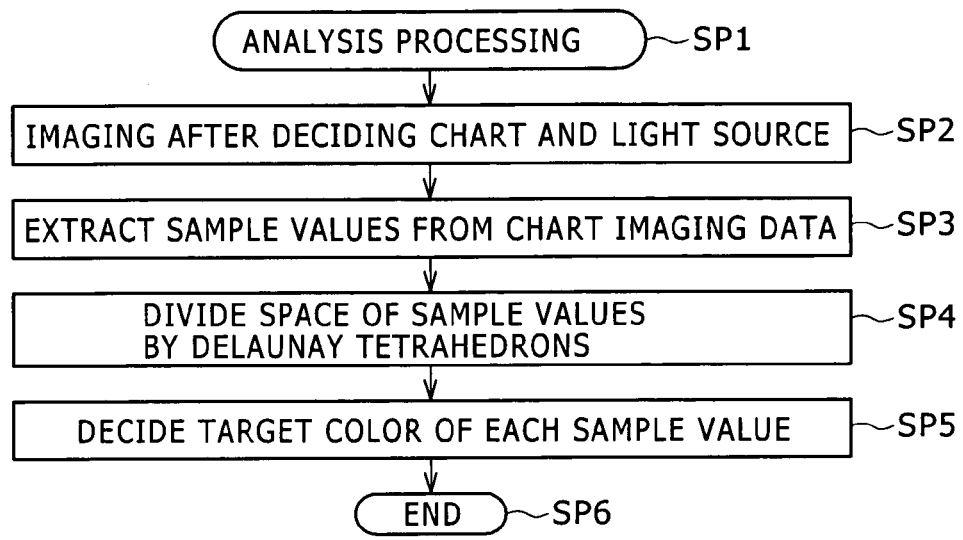
FIG. 9 is a flowchart showing analysis processing for creation of correction data for the 3D-LUT block of FIG. 1.
Figure 10:
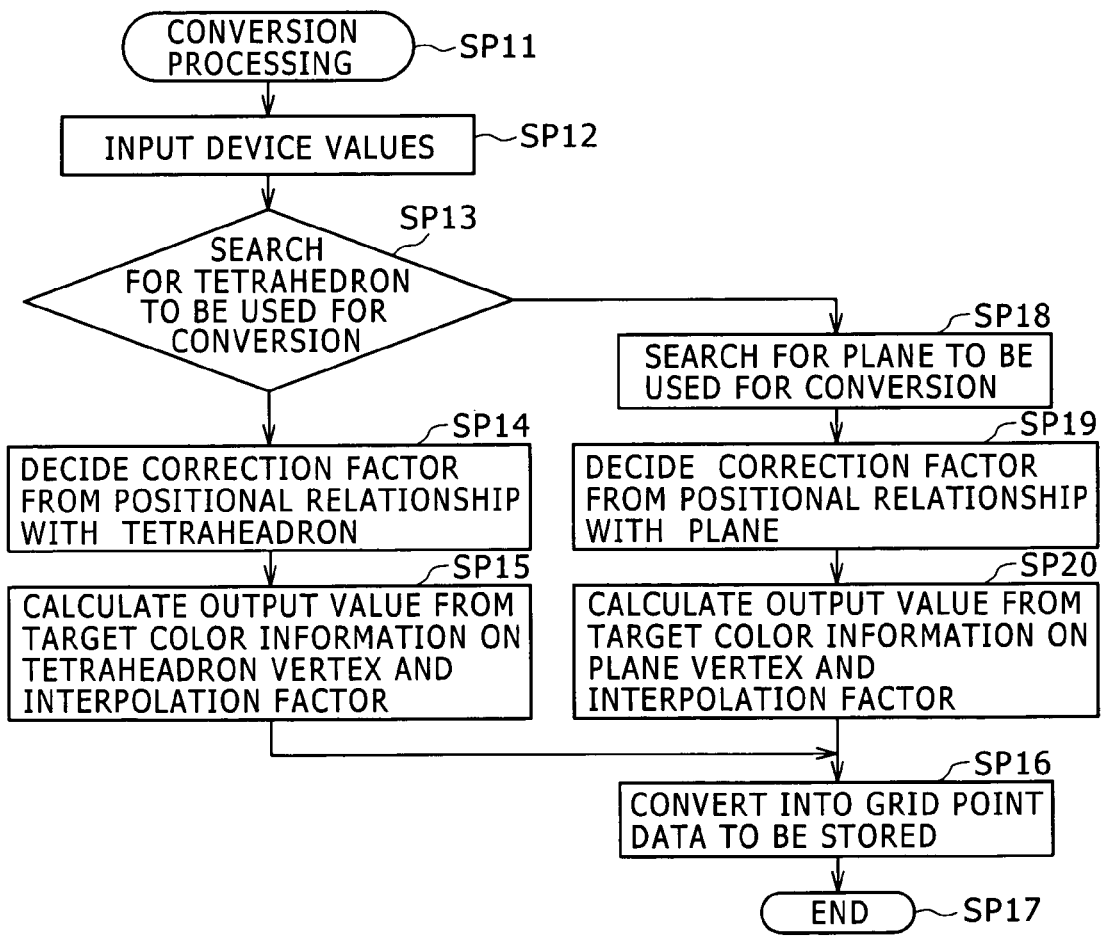
FIG. 10 is a flowchart showing conversion processing for creation of correction data for the 3D-LUT block of FIG. 1.

FIGS. 9 and 10 are flowcharts showing processing procedures for producing correction vectors of the respective grid points set in the 3D-LUT 33. For the electronic still camera 1, a computer executes these processing procedures in advance to thereby calculate the correction vectors of the respective grid points, and the correction vectors are stored in the memory 22. The processing procedures for producing the correction vectors include analysis processing shown in FIG. 9 and conversion processing shown in FIG. 10.

The analysis processing is to analyze the correspondence relationship between colors before and after correction. Upon the start of this processing procedure, the processing sequence proceeds from a step SP1 to a step SP2, where a computer acquires image data arising from imaging of a color chart with use of a predetermined light source as illumination. Used as the color chart is a reflectance chart such as Macbeth Color Checker, Macbeth Color Checker SG, or Digital Camera Color Checker. In addition, used as the light source is a D65 light source. Thus, the imaging conditions of the respective color modes in the electronic still camera 1 are duplicated. For the imaging, the electronic still camera 1 according to the present embodiment is used, and image data (Y1, Cb1, Cr1) output from the YCC converter 17 is used as image data. Thus, imaging results regarding the respective colors to be used in correction are obtained in the present embodiment.

Subsequently, in a step SP3, the computer acquires sampling points from the imaging result of the chart. The sampling points are detected in any color space, such as the L*a*b* color space, sYCC color space, or CIECAM, through arithmetic processing in which a function for conversion of the color space is used according to need.

Subsequently, the sequence proceeds to a step SP4, where the computer divides the color gamut of the sampling points obtained in the step SP3 into an assemble of Delaunay tetrahedrons on the color space used for the extraction of the sampling points. This division is executed by sequentially implementing the following operation: four sampling points that do not exist on the same plane are selected so that no other sampling point exists inside the sphere of which spherical surface includes the four sampling points, and then a tetrahedron of which vertexes are these four sampling points is set. This division method allows the gamut to be divided almost stably so that all areas in the gamut overlap with any of the Delaunay tetrahedrons and a gap area that does not overlap with any of the Delaunay tetrahedrons is not generated, without using prior knowledge about the arrangement of the sampling values.

Exceptionally, if a spherical surface including four sampling points and surrounding no sampling point includes one or more other sampling points, the division by use of Delaunay tetrahedrons for the one or more other sampling points is indefinite. In this case, random small fluctuations E are added to the sampling points so that division is implemented after the sampling points are moved away from the spherical surface.

The processing sequence of the computer proceeds to a step SP5. In the step SP5, the computer accepts the setting of the target color after conversion for each sampling point, and sets information on the target colors for the respective sampling values. The setting of the target colors is executed by extracting the colors of patches from an imaging result obtained by imaging a color chart with a reference imaging device as a design target. The setting of the target colors may be accepted according to an instruction from an operator.

The computer makes a comparison between an imaging result by the electronic still camera 1 and an imaging result by another imaging device having desired tints and grayscales. Thus, the computer produces correction data to be set in the 3D-LUT 33 through the subsequent conversion processing shown in FIG. 10.

Specifically, upon the start of the conversion processing, the processing sequence proceeds from a step SP11 to a step SP12, where the computer inputs the color value (input value: xp, yp, zp) of each of the grid points to be set in the 3D-LUT 33 based on the color space used for the detection of the sampling values in the step SP3.

In the next step SP13, for each of the color values (xp, yp, zp) of the respective grid points detected in the step SP12, the computer searches for the Delaunay tetrahedron, set in the step SP4, to which the color of the grid point belongs. The Delaunay tetrahedron the computer searches for is the tetrahedron that includes the color value (xp, yp, zp). If the Delaunay tetrahedron including the color value does not exist, the intended Delaunay tetrahedron is the tetrahedron that has a plane adequate for conversion of this color value (xp, yp, zp).

This searching is executed in such a manner of searching for the Delaunay tetrahedron having the vertexes (x0, y0, z0), (x1, y1, z1), (x2, y2, z2), (x3, y3, z3) that have the relationship of Equation 11 with respect to the input value (xp, yp, zp).

Equation 11

$$\alpha \geq 0, \beta \geq 0, \gamma \geq 0, \alpha+\beta+\gamma \leq 1 \quad (11)$$

$\alpha$, $\beta$, and $\gamma$ in Equation 11 are expressed by Equation 12.

Equation 12

$$\begin{bmatrix} \alpha \\ \beta \\ \gamma \end{bmatrix} = \begin{bmatrix} x1-x0 & x2-x0 & x3-x0 \\ y1-y0 & y2-y0 & y3-y0 \\ z1-z0 & z2-z0 & z3-z0 \end{bmatrix}^{-1} \cdot \begin{bmatrix} xp-x0 \\ yp-y0 \\ zp-z0 \end{bmatrix} \quad (12)$$

The processing sequence then proceeds from the step SP13 to a step SP14, where the computer executes arithmetic processing of Equation 13 for the grid point of which corresponding Delaunay tetrahedron including the grid point has been thus detected, to thereby calculate interpolation factors for the grid point from the relationship between the input value and the sampling values of the vertexes of the detected Delaunay tetrahedron. These interpolation factors are weighting factors to be used for calculation of the correction vector of the grid point in the subsequent step SP15, and are $\alpha$, $\beta$, and $\gamma$ in Equation 13.

Equation 13

$$\begin{bmatrix} \alpha \\ \beta \\ \gamma \end{bmatrix} = \begin{bmatrix} x1-x0 & x2-x0 & x3-x0 \\ y1-y0 & y2-y0 & y3-y0 \\ z1-z0 & z2-z0 & z3-z0 \end{bmatrix}^{-1} \cdot \begin{bmatrix} xp-x0 \\ yp-y0 \\ zp-z0 \end{bmatrix} \quad (13)$$

Subsequently, in the next step SP15, the computer calculates the target value (xt, yt, zt) of the grid point from the color information, set in the step SP5, regarding the sampling points of the vertexes of the corresponding Delaunay tetrahedron, by linear interpolation in accordance with Equation 14 employing the interpolation factors obtained in the step S14.

Equation 14

$$\begin{bmatrix} xt \\ yt \\ zt \end{bmatrix} = \begin{bmatrix} x1-x0 & x2-x0 & x3-x0 \\ y1-y0 & y2-y0 & y3-y0 \\ z1-z0 & z2-z0 & z3-z0 \end{bmatrix} \cdot \begin{bmatrix} \alpha \\ \beta \\ \gamma \end{bmatrix} + \begin{bmatrix} x0 \\ y0 \\ z0 \end{bmatrix} \quad (14)$$

In the subsequent step SP16, the computer subtracts the original input value (xp, yp, zp) from the calculated target value (xt, yt, zt), to thereby calculate the correction vector V. Thus, in the next step SP17, the computer ends the processing procedure for the grid point of which corresponding Delaunay tetrahedron can be detected in the step SP13.

In contrast, for the grid point of which corresponding Delaunay tetrahedron including the grid point cannot be detected, the processing sequence proceeds from the step SP13 to a step SP18, where the computer detects the plane of a Delaunay tetrahedron adequate for conversion of the input value (xp, yp, zp). Specifically, the computer detects from the planes of the Delaunay tetrahedrons the plane that intersects with the straight line coupling the center of color gamut of the input value with the input value (xp, yp, zp), and is a boundary to the gamut. More specifically, the computer detects the planes each having three vertexes (x1, y1, z1), (x2, y2, z2), (x3, y3, z3) that: satisfy the relationship expressed by Equation 15. The computer then searches for, of the detected planes, the plane closest to the input value (xp, yp, zp). In Equation 15, (xorg, yorg, zorg) is the coordinate representing the center of the gamut.

Equation 15

$$\delta = \begin{bmatrix} 1 & 1 & 1 \end{bmatrix} \cdot \begin{bmatrix} x1 & x2 & x3 \\ y1 & y2 & y3 \\ z1 & z2 & z3 \end{bmatrix}^{-1} \cdot \begin{bmatrix} xorg - xp \\ yorg - yp \\ zorg - zp \end{bmatrix},$$

$$\eta = \frac{1 - \begin{bmatrix} 1 & 1 & 1 \end{bmatrix} \cdot \begin{bmatrix} x1 & x2 & x3 \\ y1 & y2 & y3 \\ z1 & z2 & z3 \end{bmatrix}^{-1} \cdot \begin{bmatrix} xp \\ yp \\ zp \end{bmatrix}}{\delta} (\delta \neq 0),$$

$$\begin{bmatrix} xq \\ yq \\ zq \end{bmatrix} = \eta \cdot \begin{bmatrix} xorg - xp \\ yorg - yp \\ zorg - zp \end{bmatrix} + \begin{bmatrix} xp \\ yp \\ zp \end{bmatrix} (\eta \leq 1),$$

$$\begin{bmatrix} \alpha \\ \beta \\ \gamma \end{bmatrix} = \begin{bmatrix} x1 & x2 & x3 \\ y1 & y2 & y3 \\ z1 & z2 & z3 \end{bmatrix}^{-1} \cdot \begin{bmatrix} xq - xorg \\ yq - yorg \\ zq - zorg \end{bmatrix}, \alpha \geq 0, \beta \geq 0, \gamma \geq 0$$

(15)

Subsequently, in a step S19, the computer executes arithmetic processing of Equation 15 with use of the coordinates (x1, y1, z1), (x2, y2, z2), (x3, y3, z3) of vertexes of the plane detected in the step SP18, to thereby calculate interpolation factors $\alpha$, $\beta$ and $\gamma$ for the grid point.

Furthermore, in the subsequent step SP20, the computer executes interpolation processing expressed by Equation 16 with use of the interpolation factors $\alpha$, $\beta$ and obtained in the step SP19 and the parameter $\eta$ obtained through the arithmetic processing of Equation 15. Thus, the computer calculates the target value (xt, yt, zt) of the grid point from the color information on the vertexes of the plane.

Equation 16

$$\begin{bmatrix} xy \\ yt \\ zt \end{bmatrix} = \frac{1}{1-\eta} \left( \begin{bmatrix} x1 & x2 & x3 \\ y1 & y2 & y3 \\ z1 & z2 & z3 \end{bmatrix} \cdot \begin{bmatrix} \alpha \\ \beta \\ \gamma \end{bmatrix} - \eta \begin{bmatrix} xorg \\ yorg \\ zorg \end{bmatrix} \right)$$

(16)

Also when the target value of a grid point is calculated based on a plane of a Delaunay tetrahedron as described above, the processing sequence proceeds to the step S16, where the computer calculates the correction vector of the grid point, followed by the end of the processing.

Through this processing, the correction vector of each grid point, described for FIG. 6, is calculated on each color mode basis, and the data of the calculated correction vectors is recorded in the memory 22. The correction vector data recorded in the memory 22 is set in the 3D-LUT 33 depending on the color mode selected by a user.

In the present embodiment, the color difference matrix 18 executes chroma correction processing. Accordingly, correction vectors are calculated with the setting of target values in the step SP5 or arithmetic results in the step SP16 being corrected corresponding to the correction by the color difference matrix 18. In addition, target values are set in the step SP5 so that the lightness is not changed due to the chroma correction by the color difference matrix 18. In the creation of correction vectors, the processing of FIGS. 9 and 10 may be executed for image data (Cb2, Cr2) composed of color difference signals output from the color difference matrix 18 instead of image data (Cb1, Cr1) composed of color difference signals output from the YCC converter 17. Thus, correction vectors each having a value that is corrected corresponding to the correction by the color difference matrix 18 may be produced.

2. Operation of Embodiment

According to the above-described configuration, in the electronic still camera 1 (FIG. 4), the image data of an imaging result obtained from the imaging element 12 is subjected to processing such as linear matrix, auto white balance, and gamma correction, followed by being converted by the YCC converter 17 into image data (Y1, Cb1, Cr1) defined by a luminance signal and color difference signals. Of the image data (Y1, Cb1, Cr1), the image data (Cb1, Cr1) based on color difference signals is subjected to chroma correction by the color difference matrix 18. Thus, image data (Y2, Cb2, Cr2) based on a luminance signal and color difference signals is created. The hue and grayscale of the image data (Y2, Cb2, Cr2) composed of a luminance signal and color difference signals are corrected by the 3D-LUT block 19, and then the resultant data is recorded in a recording medium and is displayed on the liquid crystal display 2.

In this correction of the hue and grayscale by the 3D-LUT block 19 (FIG. 1), the hue and grayscale of the image data (Y2, Cb2, Cr2) defined by a luminance signal and color difference signals are corrected by the 3D-LUT 33 for three components of this image data (Y2, Cb2, Cr2). In this correction of the hue and grayscale by the 3D-LUT 33 for three components of the image data (Y2, Cb2, Cr2), the correction of only the lightness or only the chroma is possible. In addition, correction without changing the lightness and chroma that have been changed through chroma correction by the color difference matrix 18 is also possible. Thus, in the present embodiment, a change of the lightness due to chroma correction can be prevented through the entire processing including the processing by the color difference matrix 18, which correspondingly allows image quality to be corrected with the deterioration thereof being avoided effectively.

Furthermore, in such correction of hue and grayscale by the 3D-LUT 33, it is possible to adjust only a limited area of a color space with use of data set in the 3D-LUT 33. Thus, all the representative colors can be adjusted optimally without adjustment operations for the respective representative colors affecting each other. In addition, even if colors have similar hues, a desired color can be adjusted optimally so that this adjustment has no effect on another color. Moreover, processing in consideration of a color that is readily saturated and a color having a reduced tendency of being saturated is also allowed. Thus, image quality can be corrected flexibly with the deterioration thereof being avoided effectively.

Since such correction is executed by the built-in 3D-LUT 33, an imaging result having desired image quality can be obtained without recording the imaging result in a recording medium and then implementing processing therefor with use of a computer, and thus the image quality can be corrected readily. According to the above-described features, in the present embodiment, image quality can be corrected readily and flexibly with the deterioration thereof being avoided effectively.

Provided in the electronic still camera 1 are plural kinds of image quality correction modes corresponding to imaging environments and user's preferences. Stored in the memory 22 is plural kinds of correction vector data, which is correction data to be set in the 3D-LUT 33, corresponding to the respective image quality correction modes. A menu of color modes (FIG. 3) is displayed on the liquid crystal display 2 in response to operation by a user, and selection from the menu by the user leads to the setting of the corresponding correction data in the 3D-LUT 33. Accordingly, in the electronic still camera 1, the sampling values of image data are corrected based on the correction data set in the 3D-LUT 33, and the image data having image quality desired by a user is output.

Thus, the electronic still camera 1 can switch image quality variously according to imaging environments and user's, preferences, which correspondingly allows the improvement of its usability. In this switching of image quality, conversion parameters of the address decoder 32 may also be switched so that assignment to a color space is changed on each image quality correction mode basis.

Specifically, in the electronic still camera 1, defined as grid points are predetermined sampling points among sampling points, in a color space, that can be occupied by image data (Y2, Cb2, Cr2) to be corrected, and correction data for the respective grid points is set in the 3D-LUT 33 (FIGS. 5 to 8). The area determiner 31 detects the reference grid point g1 and the offset p, which indicate the area and position, defined by the grid points, where the image data (Y2, Cb2, Cr2) exists. Through access to the 3D-LUT 33 based on the reference grid point g1, correction data G1 to G8 of the grid points surrounding the sampling point of the image data (Y2, Cb2, Cr2) is detected. Furthermore, with use of the offset p, the interpolation factor calculator 34 calculates the interpolation factor for interpolation arithmetic processing with use of the correction data G1 to G8. Moreover, interpolation processing with use of this interpolation factor allows the calculation of the correction vector V for the sampling value of the image data (Y2, Cb2, Cr2), and the chroma and lightness of the image data (Y2, Cb2, Cr2) are corrected based on this correction vector V.

In this manner, in the electronic still camera 1, correction amounts are obtained by the 3D-LUT 33 and thus input image data is corrected. In the image data correction by use of the 3D-LUT 33, it is also possible for the 3D-LUT 33 to directly supply output values. However, if the 3D-LUT 33 outputs correction amounts for image data correction like the present embodiment, the size of the 3D-LUT can be reduced compared with the case where output values are directly output therefrom.

The correction data to be set in the 3D-LUT 33 is produced as follows. Initially, image data obtained from the imaging of a color chart as a reference image by the electronic still camera 1 with use of reference illumination is sampled. Subsequently, Delaunay tetrahedrons having vertexes corresponding to the sampling values resulting from this sampling are defined, and thus the color space defined by the imaging result is divided by the Delaunay tetrahedrons. The target colors are then set for the sampling values corresponding to the vertexes of the respective Delaunay tetrahedrons. Furthermore, the sampling points of grid points are set in the color space divided by the Delaunay tetrahedrons, and then the target colors of the respective grid points are set through interpolation arithmetic processing with use of the target colors set for the vertexes of the Delaunay tetrahedrons. In the electronic still camera 1, the correction data for each grid point is produced based on the target color of the grid point, and is stored in the memory 22. In the electronic still camera 1, the setting of the target colors of the vertex positions of the Delaunay tetrahedrons are set by extracting the colors of patches from an imaging result obtained by imaging a color chart with a reference imaging device as a design target. Correction data is then produced from a comparison between the imaging result by the electronic still camera 1 and that by the reference imaging device. Thus, correction data to be set in the 3D-LUT 33 can be produced so that easy and ensured adjustment to desired image quality is allowed.

3. Advantageous Effects of Embodiment

According to the above-described configuration, a 3D-LUT is provided in an image processor and an imaging result is corrected by use of the 3D-LUT, to thereby enable image quality to be readily and flexibly corrected, with the deterioration thereof being avoided effectively.

In addition, plural kinds of correction data are prepared as data to be set in the 3D-LUT, and the setting of data in the 3D-LUT is selectively carried out according to an instruction from a user. Thus, the type of image quality correction can be switched variously through easy operation.

Moreover, a menu of plural kinds of image quality correction modes is displayed on a display unit for accepting selection by a user, and correction data is set in the 3D-LUT in response to the selection by the user, which enables even a user with poor knowledge to easily and surely correct an imaging result to desired image quality.

Second Embodiment

Figure 11:
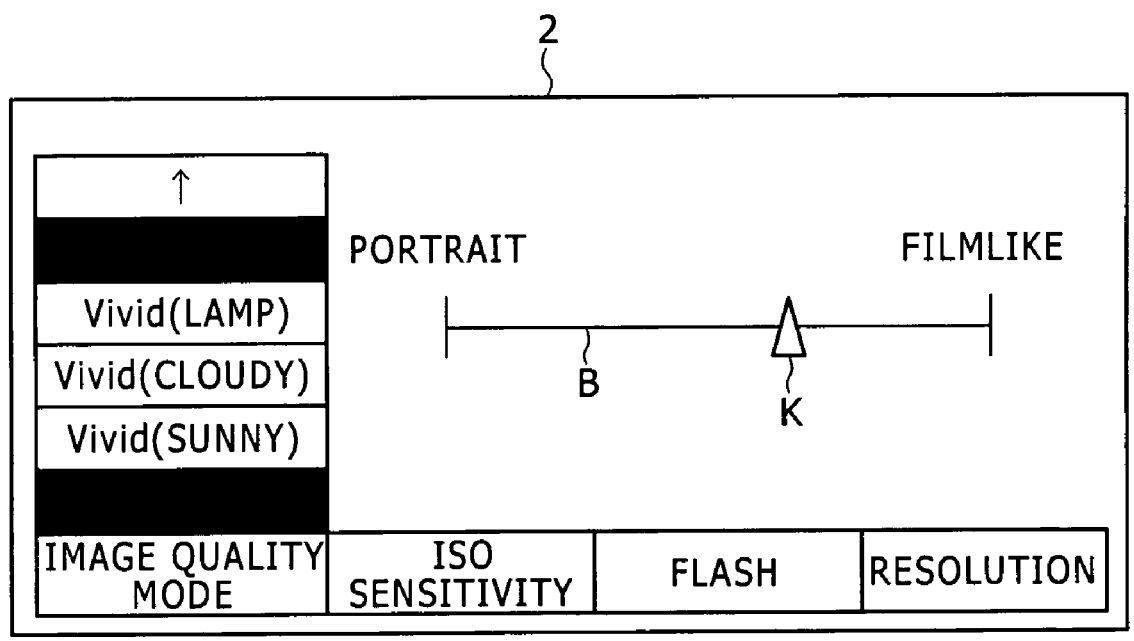
FIG. 11 is a plan view illustrating a menu screen of an electronic still camera according to a second embodiment of the invention.

FIG. 11 is a plan view illustrating a color mode setting screen in an electronic still camera according to a second embodiment of the invention. The electronic still camera according to this embodiment accepts setting of image quality correction through this color mode setting screen, and sets correction data in a 3D-LUT. The second embodiment has the same configuration as that of the electronic still camera 1 of the first embodiment, except that a series of processing relating to the color mode setting is different. Therefore, the following description also employs the above-described configurations of FIGS. 1 and 4.

Displayed on this setting screen in the initial state is a menu including items such as image quality correction mode (color mode), ISO sensitivity, flash, and resolution similarly to the above description for the first embodiment (FIG. 3). Selecting from the menu leads to the indication of the corresponding sub menu. Specifically, when the item of image quality correction mode is selected, a sub menu including portrait, Vivid (lamp), Vivid (cloudy), Vivid (sunny), filmlike as color modes is indicated.

In the present embodiment, when a user issues an instruction to correct image quality to an intermediate tone in the series of operations of the menu, selection of a plurality of items as color modes is accepted, and the image quality of an imaging result is corrected so that the image has an intermediate tone between the image qualities of the plurality of items.

Figure 12:
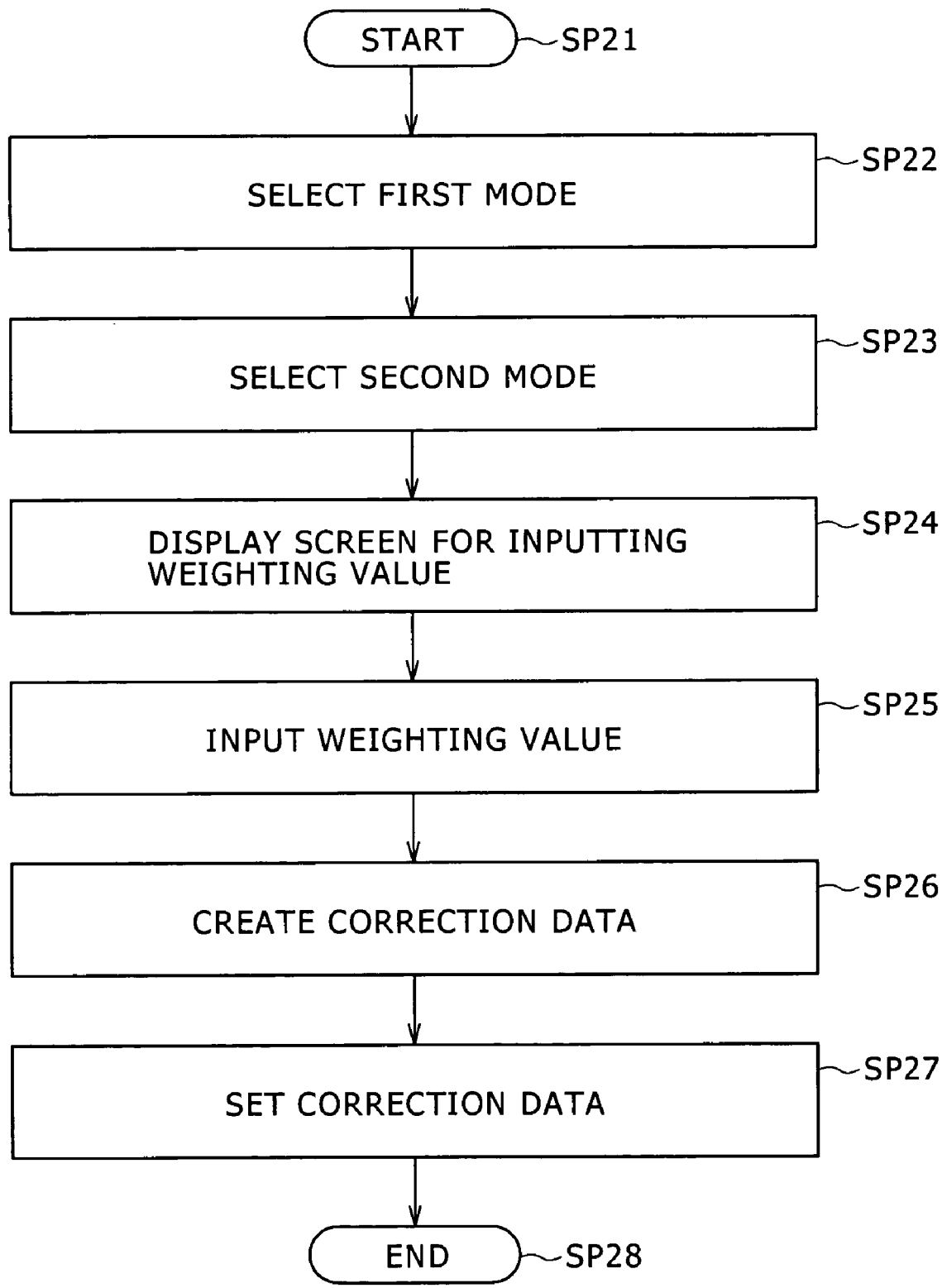
FIG. 12 is a flowchart showing a series of processing steps relating to the menu screen of FIG. 11.

FIG. 12 is a flowchart showing a processing procedure in a controller 21 relating to processing of this image quality setting. When a sub menu including plural items as color modes is indicated as shown in FIG. 11, the processing procedure starts and proceeds from a step SP21 to a step SP22, where the controller 21 accepts the selection of a first color mode. In the subsequent step SP23, the controller 21 accepts the selection of a second color mode. Thus, the controller 21 accepts the input of two color modes that serve as a basis for an intermediate tone.

Subsequently, in a step SP24, the controller 21 displays a screen for accepting the input of an intermediate tone. In the present embodiment, a bar B of which both ends correspond to the first and second color modes is indicated on the right side of the above-described sub menu for various color modes (see FIG. 11), and indicated on the bar B is a cursor K. The cursor K is moved through the operation of the touch panel 3 and the like by a user, so that the setting of an intermediate tone is accepted through the setting of position of the cursor K on the bar B. Therefore, when the position of the cursor K on the bar B is brought close to one end, the controller 21 brings an intermediate tone close to the color mode of the one end.

Thus, in response to a decision operation by the user, the controller 21 generates a weighting factor k for the first and second color modes according to the internal division value by the cursor K with respect to the entire length of the bar B. In the subsequent step SP26, correction data corresponding to the first and second color modes is sequentially loaded from the memory 22 and is recorded in a register. Arithmetic processing of Equation 17 is then executed with use of the correction data recorded in the register, to thereby create correction data L0 for an intermediate tone through interpolation processing with correction data L1 and L2 relating to two color modes.
Equation 17

$$L0 = k*L1 + (1-k)*L2 \tag{17}$$

In the next step SP27, the controller 21 sets the thus generated correction data L0 for the intermediate tone in the 3D-LUT 33, and then switches the indication on the liquid crystal display 2 to notify a user of the completion of the setting. The processing sequence then proceeds to a step SP28, where this processing procedure is ended.

The thus created correction data for an intermediate tone may be recorded and held, and the image quality correction mode according to this intermediate tone correction data may be utilized as a basis for setting another intermediate tone, or the like.

In the second embodiment, correction data arising from interpolation arithmetic is created through interpolation arithmetic processing with plural kinds of correction data recorded in the memory 22, and the correction data arising from interpolation arithmetic is set in a 3D-LUT instead of the correction data recorded in the memory 22. Thus, image quality correction can be adjusted finely by use of pre-set image quality correction modes as a basis, which correspondingly allows image quality to be corrected flexibly through easy operation. The utilization of the correction data arising from interpolation arithmetic can offer various conveniences such as an increase in Variations of image quality correction modes. In addition, it is possible to ensure a large number of image quality correction modes of which number is larger than the number of kinds of correction data recorded in the memory 22, which can reduce the memory space to be used for recording of correction data.

Furthermore, since the setting of an intermediate tone is accepted with image quality correction modes serving as a basis being indicated on a display unit, even a user having poor knowledge can implement the setting of a desired intermediate tone easily and surely.

Third Embodiment

Figure 13:
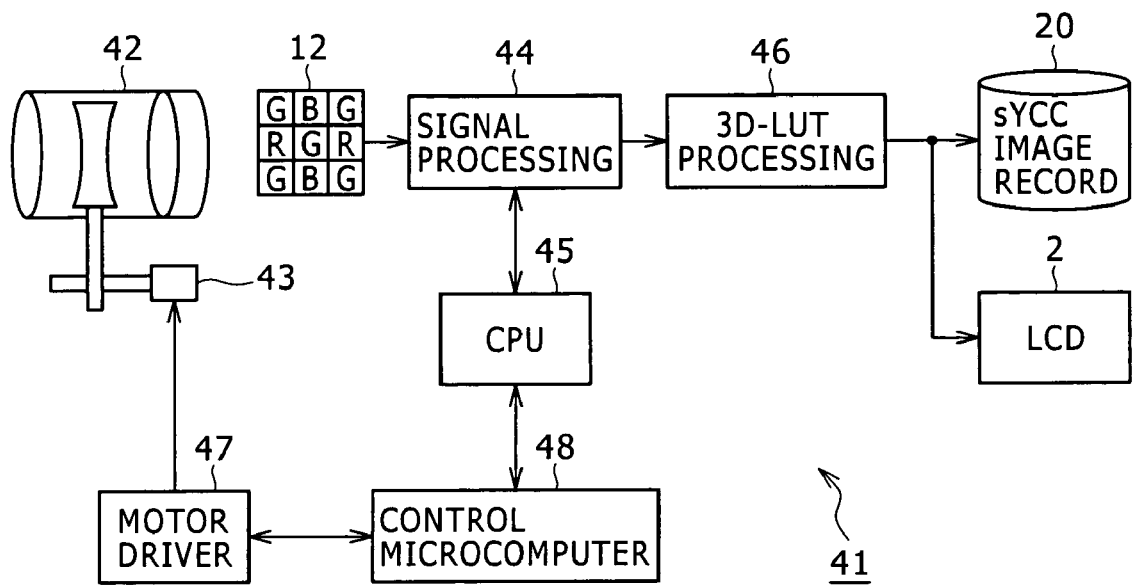
FIG. 13 is a block diagram illustrating an electronic still camera according to a third embodiment of the invention.

FIG. 13 is a block diagram illustrating an electronic still camera 41 according to a third embodiment of the invention. In the electronic still camera 41, the same components as those in the electronic still camera of the first and second embodiments are given the same numerals, and overlapping description thereof will be omitted. The electronic still camera 41 automatically selects an image quality correction mode according to imaging conditions that can be detected at the time of imaging.

In the electronic still camera 41, the driving of a motor 43 moves a focus lens 42 in the optical axis direction, and thus the focus is adjusted so that an optical image is formed on the imaging plane of an imaging element 12.

A signal processor 44 serves as a configuration including the above-described components from the demosaic processor 13 to the gamma corrector 16 in the first embodiment. The signal processor 44 converts an imaging result obtained from the imaging element 12 into image data, and then processes and outputs the image data. In this series of processing, the signal processor 44 detects the high-pass signal level of the imaging result to thereby acquire information for focus adjustment, and notifies a central processing unit (CPU) 45 of this focus adjustment information. In addition, the signal processor 44 detects the area that is determined to achieve just focus from the focus adjustment information, and notifies the CPU 45 of the distribution of the luminance level in this area.

A three-dimensional look-up table (3D-LUT) processor 46 serves as a configuration including the above-described components from the YCC converter 17 to the 3D-LUT block 19 in the first embodiment. The 3D-LUT 46 corrects the chroma and lightness of image data and outputs the corrected data. Furthermore, the 3D-LUT 46 processor renews data in the 3D-LUT to be used for the correction of chroma and lightness, under control by the CPU 45.

The CPU 45 is a controller for controlling the signal processor 44 and the 3D-LUT processor 46. In response to an instruction from a control microcomputer 48, the CPU 45 controls the operations of the signal processor 44 and the 3D-LUT processor 46, and produces correction data for the 3D-LUT processor 46. In addition, the CPU 45 notifies the control microcomputer 48 of information for focus adjustment and information on luminance level distribution that are output from the signal processor 44.

A motor driver 47 drives the motor 43 under control by the control microcomputer 48. The control microcomputer 48 is a controller that controls the operation of the entire electronic still camera 1, and controls the operation of each component in response to the operation of an operating element and the like. In this control, the control microcomputer 48 obtains focus adjustment information from the signal processor 44 via the CPU 45, and drives the motor driver 47 by a so-called hill-climbing method to thereby implement auto-focus control of the lens 42. Through this auto-focus control, the control microcomputer 48 detects the current focus position.

In addition, the control microcomputer 48 acquires via the CPU 45 information on the luminance level distribution of the area that is determine to achieve just focus, detected by the signal processor 44. The control microcomputer 48 then determines the luminance level distribution based on the current focus position, and selects an image quality correction mode.

Figure 14:
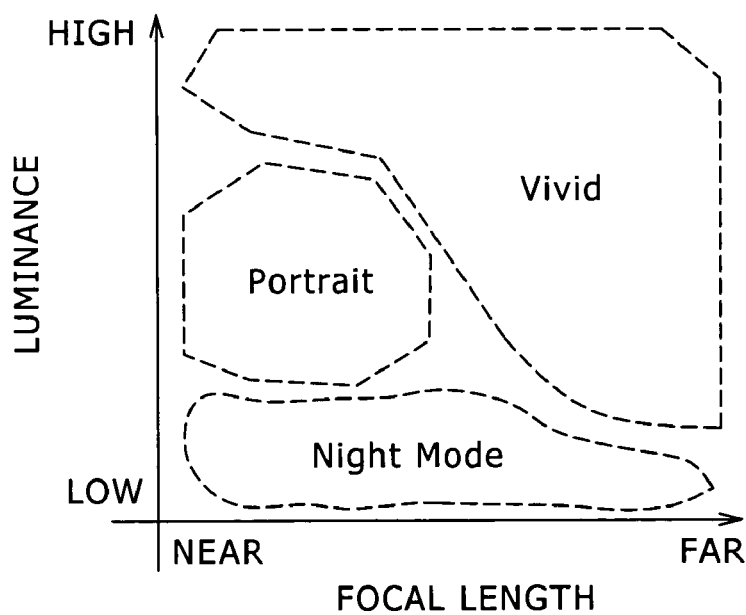
FIG. 14 is a characteristic curve diagram for explaining the operation of the electronic still camera of FIG. 13.

Specifically, as shown in FIG. 14, when the current focus position is at a far distance and the luminance level of the area that is determined to achieve just focus is larger than a certain value, or when the current focus position is at a near distance and the luminance level of the area that is determined to achieve just focus is high, a determination is made that it is highly possible that a landscape is to be imaged. Thus, the image quality correction mode is set to a landscape imaging mode (Vivid).

In contrast, when the current focus position is at a near distance and the luminance level of the area that is determined to achieve just focus is a middle level, a determination is made that it is highly possible that a person is to be imaged. Thus, the image quality correction mode is set to a person imaging mode (Portrait). On the contrary, when the luminance level of the area that is determined to achieve just focus is low, a determination is made that it is highly possible that imaging during nighttime is to be carried out. Thus, the image quality correction mode is set to a nighttime imaging mode (Night Mode). In this determination of an image quality correction mode, a pattern matching method can be used.

The control microcomputer 48 then instructs the CPU 45 to set the 3D-LUT processor 46 according to the image quality correction mode resulting from the determination. In this setting, the above-described setting method of any of the first and second embodiments can be used. The image quality correction mode may be set based only on information for auto focus adjustment if the image quality correction mode can be set adequately enough in terms of practical use.

According to the third embodiment, correction data for a 3D-LUT is switched depending on the current focus position achieved by auto focus adjustment, which is one of imaging conditions that can be detected at the time of imaging. Thus, an advantage of adequately executing image quality correction more readily according to imaging conditions can be achieved in addition to advantages similar to those in the above-described embodiments.

Fourth Embodiment

Figure 15:
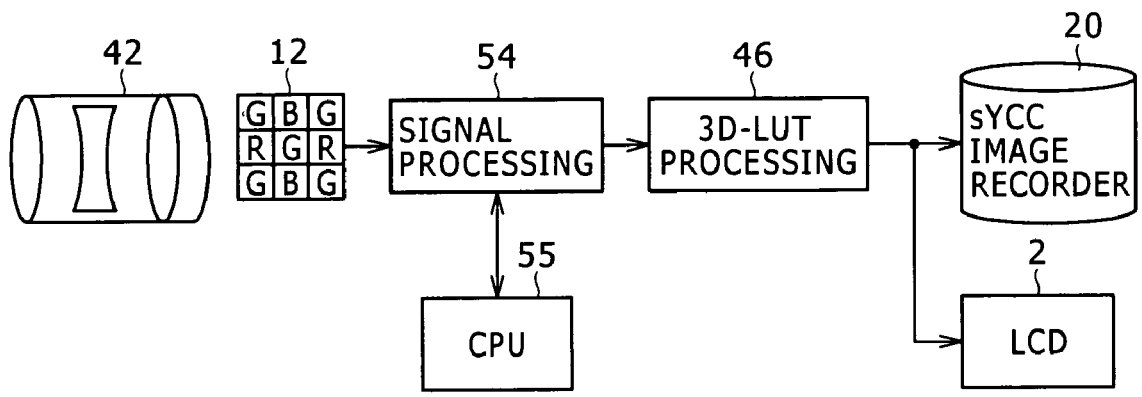
FIG. 15 is a block diagram illustrating an electronic still camera according to a fourth embodiment of the invention.

FIG. 15 is a block diagram illustrating an electronic still camera 51 according to a fourth embodiment of the invention. In the electronic still camera 51, the same components as those in the electronic still cameras of the first, second and third embodiments are given the same numerals, and overlapping description thereof will be omitted. The electronic still camera 51 automatically selects an image quality correction mode based on the color temperature of an imaging result before auto white balance adjustment as one of imaging conditions that can be detected at the time of imaging.

Specifically, in the electronic still camera 51, a signal processor 54 serves as a configuration including the above-described components from the demosaic processor 13 to the gamma corrector 16 in the first embodiment. The signal processor 54 converts an imaging result obtained from an imaging element 12 into image data, and then processes and outputs the image data. In this series of processing, the signal processor 54 notifies a central processing unit (CPU) 55 of information on the gains of the respective color signals relating to auto white balance adjustment.

The CPU 55 is a controller for controlling the signal processor 54 and a 3D-LUT processor 46. In response to an instruction from a control microcomputer (not shown), the CPU 55 controls the operations of the signal processor 54 and the 3D-LUT processor 46. In this series of control, the CPU 55 determines the gains of the respective color signals relating to auto white balance adjustment, informed by the signal processor 54, to thereby detect the color temperature of the imaging target object. Furthermore, the CPU 55 renews correction data for the 3D-LUT processor 46 based on the result of the color temperature detection.

Figure 16:
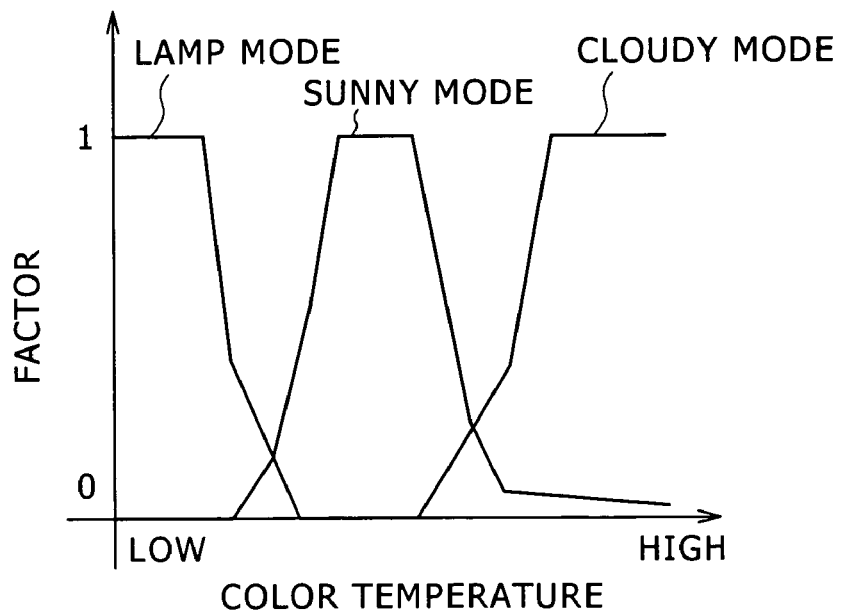
FIG. 16 is a characteristic curve diagram for explaining the operation of the electronic still camera of FIG. 15.

Specifically, as shown in FIG. 16, the color temperature of a target object delicately varies depending on which of a sunny condition, a cloudy condition, and a lamp condition an imaging condition is. Therefore, the look of the skin color of a person and the like differs depending on the condition. Accordingly, in the fourth embodiment, an image quality correction mode is selected according to a detected color temperature, and correction data corresponding to the selected image quality correction mode is set in the 3D-LUT processor 46. In this setting, any of the above-described setting methods of the first and second embodiments can be used.

According to the fourth embodiment, correction data for a 3D-LUT is switched depending on a color temperature, which is one of imaging conditions that can be detected at the time of imaging. Thus, an advantage of adequately executing image quality correction more readily according to imaging conditions can be achieved in addition to advantages similar to those in the above-described embodiments.

Fifth Embodiment

In a fifth embodiment of the invention, the image quality correction mode is switched based on the combination of the above-described determinations regarding an imaging result in the third and fourth embodiments. An electronic still camera according to the fifth embodiment has the same configuration as that of the above-described electronic still cameras of the third and fourth embodiments, except for a configuration relating to the combination.

Specifically, in the fifth embodiment, provided in an electronic still camera are reference patterns for determining a current focus position, a luminance level and the color temperature of an imaging result, for image quality correction modes M1 to Mn corresponding to plural kinds of correction data stored in a memory 22. In addition, through pattern matching by use of these reference patterns, the electronic still camera determines a current focus position, the luminance level of an area that is determined to achieve just focus, and the color temperature of an imaging result, which are obtained from the imaging result. Thus, the electronic still camera produces weighting factors k1 to kn for the image quality correction modes M1 to Mn, respectively.

In the electronic still camera, as expressed by Equation 18, weighted addition of control data L1 to Ln of the image quality correction modes M1 to Mn is implemented with use of the weighting factors k1 to kn. Thus, correction data L0 resulting from interpolation arithmetic processing is produced. In the electronic still camera, the correction data L0 resulting from the interpolation processing is set in a 3D-LUT.

Equation 18

$$L0 = \sum_i ki * Li \qquad (18)$$

In the fifth embodiment, correction data is produced by determining imaging conditions that can be detected at the time of imaging through pattern matching for each image quality correction mode. Thus, an advantage of more adequately executing image quality correction can be achieved in addition to advantages similar to those of the above-described embodiments.

Sixth Embodiment

Figure 17:
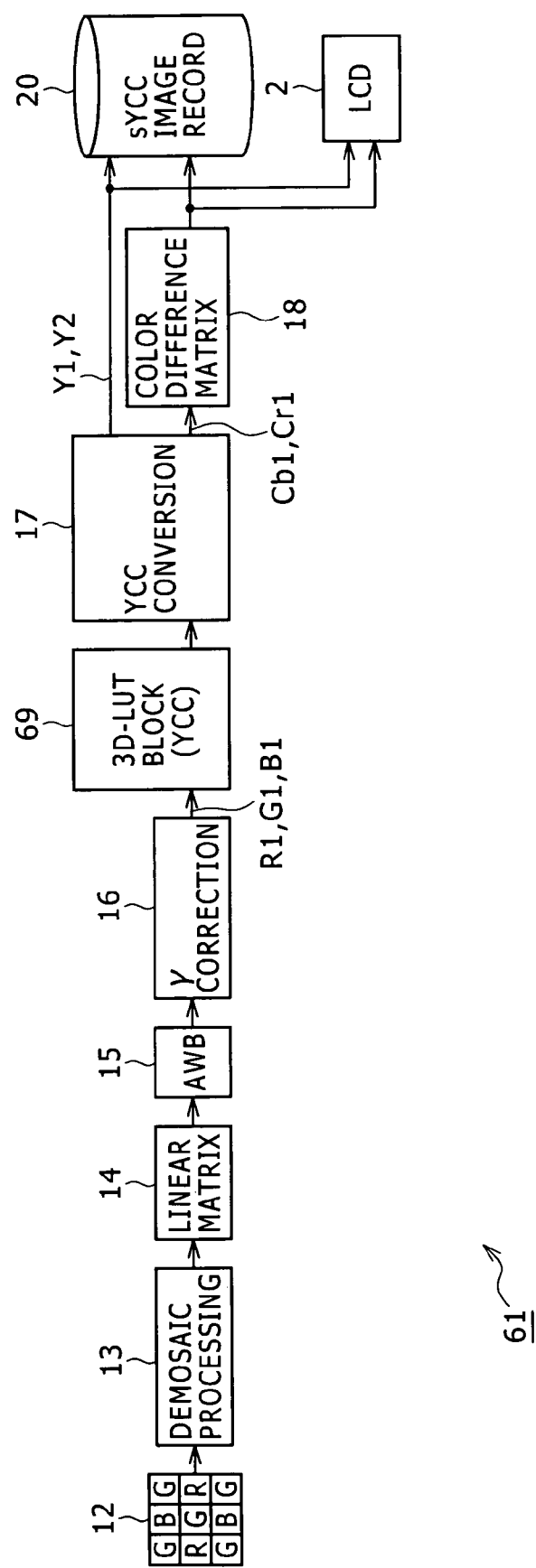
FIG. 17 is a block diagram illustrating an electronic still camera according to a sixth embodiment of the invention.

FIG. 17 is a block diagram illustrating an electronic still camera 61 according to a sixth embodiment of the invention. In the electronic still camera 61, the same components as those in the electronic still cameras of the above-described embodiments are given the same numerals, and overlapping description thereof will be omitted. The electronic still camera 61 has the same configuration as that of any of the above-described electronic still cameras of the first to fifth embodiments, except that a 3D-LUT block 69 is provided upstream of a YCC converter 17. Thus, in the sixth embodiment, image quality correction by a 3D-LUT is carried out for image data made up of primary color signals before being subjected to chroma correction by a color difference matrix 18.

Even when, like the sixth embodiment, image quality correction by a 3D-LUT is carried out before chroma correction by the color difference matrix 18, and for image data defined by primary color signals, advantages similar to those of the above-described embodiments can be achieved.

Seventh Embodiment

Figure 18:
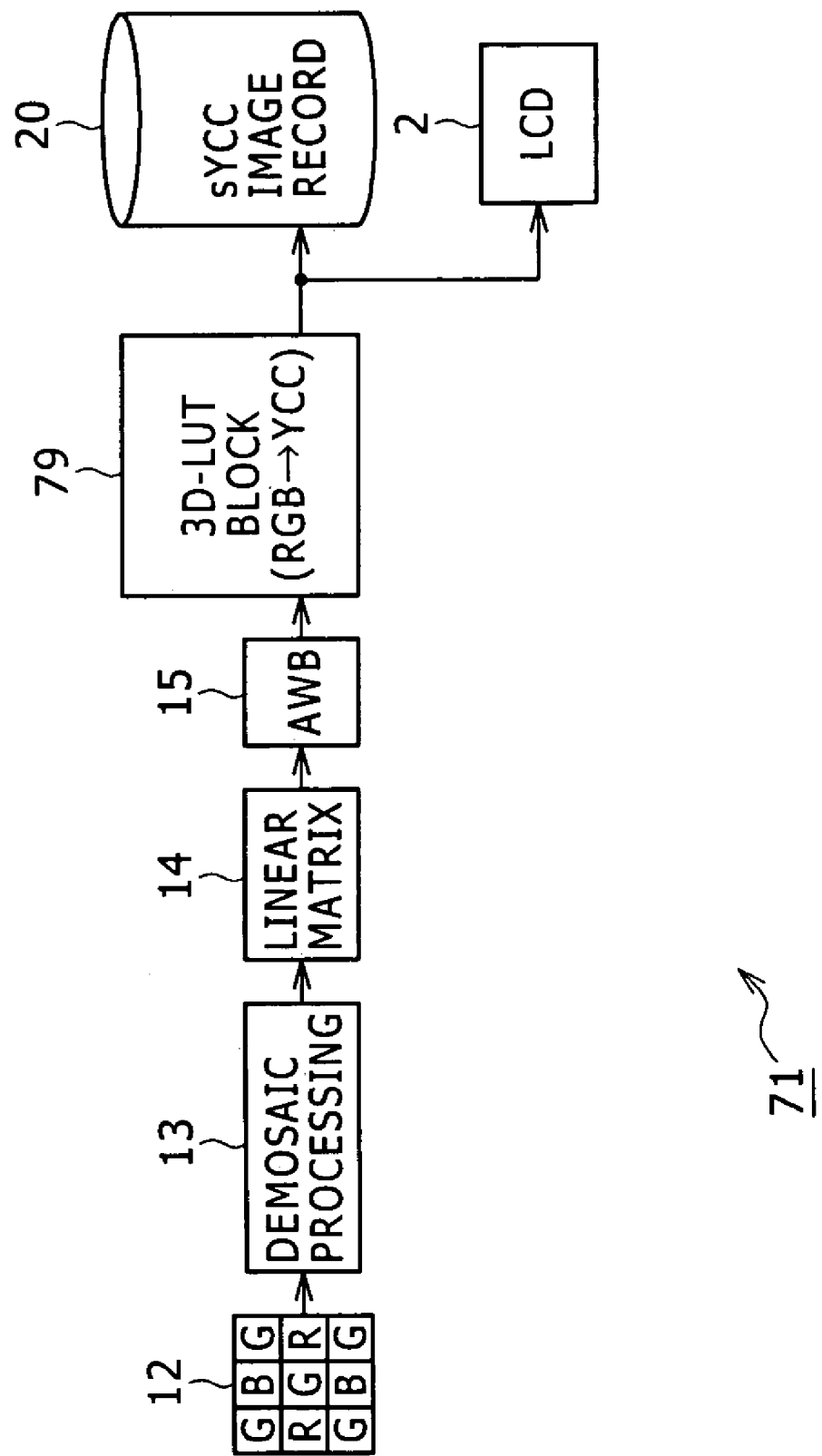
FIG. 18 is a block diagram illustrating an electronic still camera according to a seventh embodiment of the invention.

FIG. 18 is a block diagram illustrating an electronic still camera 71 according to a seventh embodiment of the invention. In the electronic still camera 71, the same components as those in the electronic still cameras of the above-described embodiments are given the same numerals, and overlapping description thereof will be omitted. The electronic still camera 71 does not include the γ corrector 16, the color difference matrix 18, and the YCC converter 17 (see FIG. 4), and processing originally executed by these components, such as chroma correction and grayscale correction, is executed only by a 3D-LUT block 79. The electronic still camera according to the seventh embodiment has the same configuration as that of any of the above-described electronic still cameras of the first to fifth embodiments, except that a configuration relating to the 3D-LUT block 79 is different.

Even when, like the seventh embodiment, chroma adjustment, grayscale adjustment, and conversion from image data composed of primary color signals into image data defined by a luminance signal and color difference signals are executed only by use of a 3D-LUT, advantages similar to those of the above-described embodiments can be achieved. Moreover, if chroma adjustment, grayscale adjustment, and conversion from image data composed of primary color signals into image data defined by a luminance signal and color difference signals are executed only by use of a 3D-LUT, an advantage of simplifying the entire configuration can be achieved in addition to the advantages similar to those of the above-described embodiments.

Eighth Embodiment

An eighth embodiment of the invention employs any of the configurations of the first to seventh embodiments. However, in the eighth embodiment, correction data L1 based on certain reference vectors, recorded and held in a memory 22, is multiplied by a gain k to thereby produce correction data L0 as expressed by Equation 19 and store the correction data L0 in a 3D-LUT 33. In the eighth embodiment, image quality is adjusted through control of the gain k. This image quality adjustment through control of the gain k may be combined with any of the above-described image quality adjustment methods of the first to seventh embodiments.

Equation 19

$$L0 = k*L1 \quad (19)$$

If, like the eighth embodiment, reference correction data is corrected by use of a weighting factor and is stored in the 3D-LUT 33 so that image quality is adjusted through variation in the weighting factor, advantages of reducing the capacity of memory for correction data and efficiently adjusting color correction amounts can be achieved in addition to advantages similar to those of the above-described embodiments.

Ninth Embodiment

Figure 19:
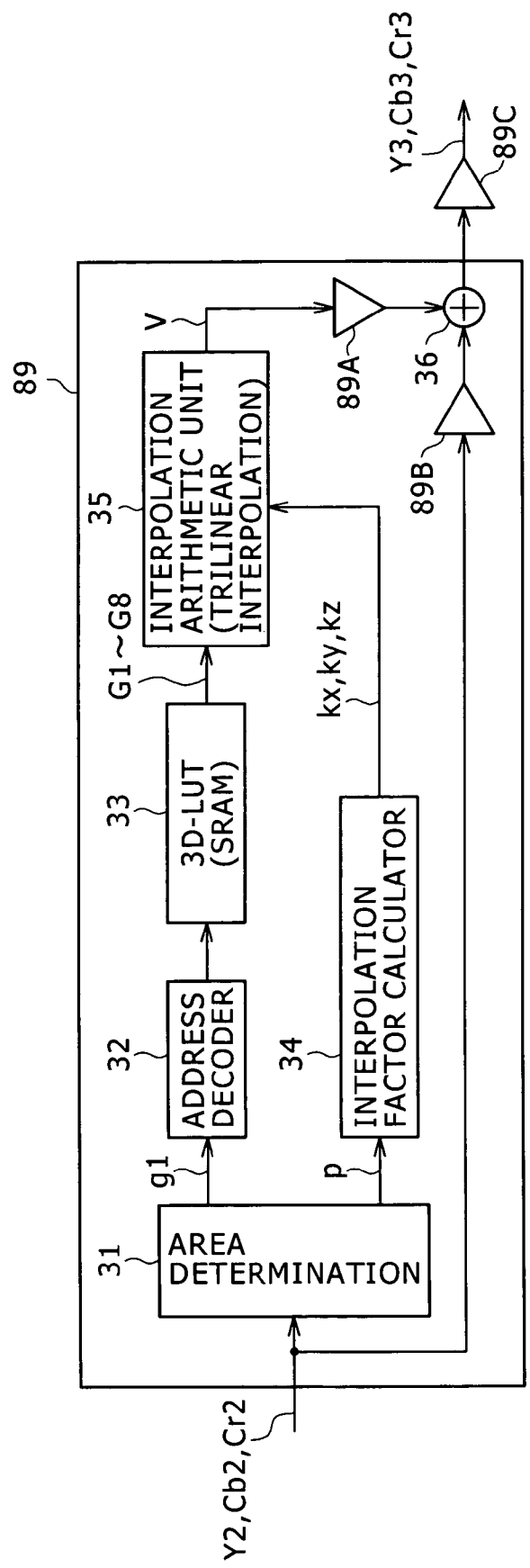
FIG. 19 is a block diagram illustrating a 3D-LUT block applied to an electronic still camera according to a ninth embodiment of the invention.

FIG. 19 is a block diagram illustrating a 3D-LUT block applied to an electronic still camera according to a ninth embodiment of the invention. The electronic still camera according to the ninth embodiment has a configuration obtained by applying a 3D-LUT block 89 to the configuration of any of the above-described electronic still cameras of the first to seventh embodiments.

The 3D-LUT block 89 is provided with a multiplier 89A that weights a correction vector V output from the interpolation arithmetic unit 35 and outputs the weighted vector to an adder 36, and a multiplier 89C that weights the output value from the adder 36 and outputs the weighted value. Thus, image quality is adjusted through the setting of the weighting factors in these multipliers 89A and 89C, instead of the setting of correction data in the 3D-LUT 33 described above for the first to seventh embodiments, or in addition to the setting of correction data in the 3D-LUT 33.

Specifically, in this electronic still camera, the correction vector V is weighted with a weighting factor k by the multiplier 89A, and the weighted vector is added to input image data by the adder 36 as expressed by Equation 20. Thus, image quality is corrected. In addition, in order to cancel an increase in the gain due to the weighting by the multiplier 89A, the multiplier 89C executes weighting to decrease the gain correspondingly.

Equation 20

$$(Y3\ Cb3\ Cr3) = (Y2\ Cb2\ Cr2) + k*V \quad (20)$$

If there is no restriction on the bit precision, the multiplier 89C may be absent. In addition, a multiplying circuit 89B may be provided for input image data, and weighting by the multiplier 89B may be executed instead of weighting by the multiplier 89A, or in addition to weighting by the multiplier 89A. The weighting by the multiplier 89B provided for input image data instead of weighting by the multiplier 89A is equivalent to the state where an output value from the 3D-LUT 33 is output after being indirectly weighted with a weighting factor. This image quality adjustment may be combined with any of the above-described image quality adjustment methods of the first to eighth embodiments.

According to the ninth embodiment, an output value from a 3D-LUT is output after being weighted with a weighting factor so that image quality is adjusted through variation in the weighting factor. Thus, advantages of reducing the capacity of memory for correction data and efficiently adjusting color correction amounts can be achieved in addition to advantages similar to those of the above-described embodiments.

Tenth Embodiment

Figure 20:
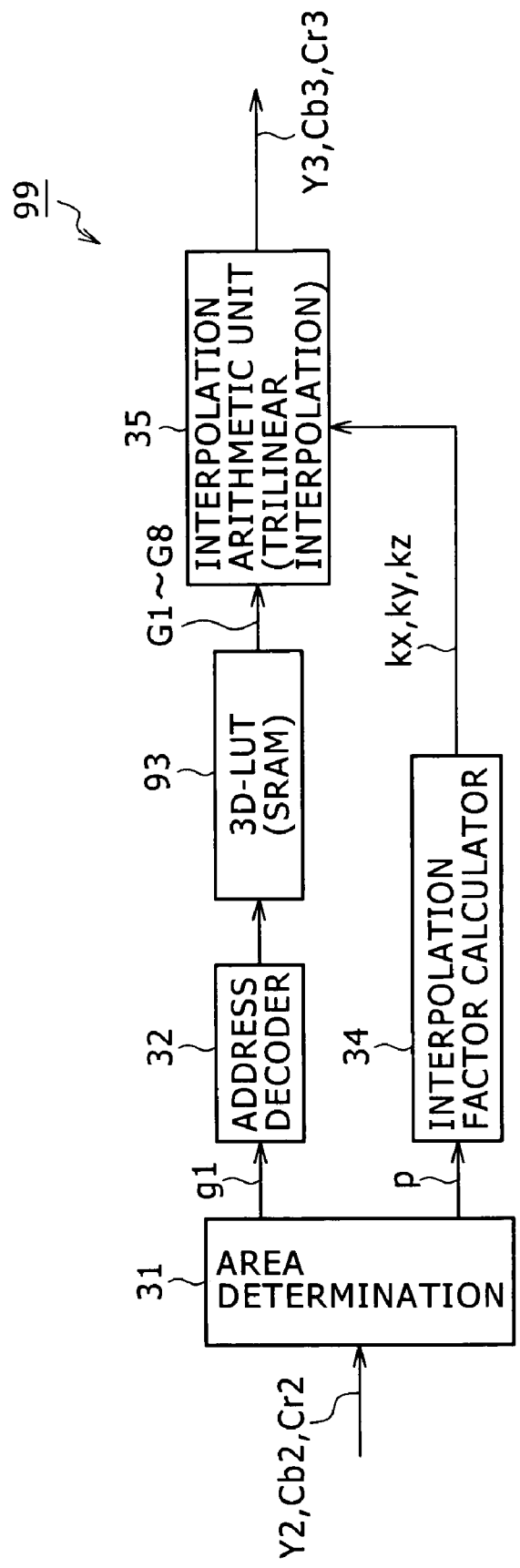
FIG. 20 is a block diagram illustrating a 3D-LUT block applied to an electronic still camera according to a tenth embodiment of the invention.

FIG. 20 is a block diagram illustrating a 3D-LUT block applied to an electronic still camera according to a tenth embodiment of the invention. The electronic still camera according to the tenth embodiment has a configuration obtained by applying a 3D-LUT block 99 to the configuration of any of the above-described electronic still cameras of the first to seventh embodiments.

The 3D-LUT block 99 has a configuration in which an output value (Y3, Cb3, Cr3) is directly output from a 3D-LUT 93, and correction data compatible with this configuration is set in the 3D-LUT 93. The electronic still camera of the tenth embodiment has the same configuration as that of any of the above-described electronic still cameras of the first to seventh embodiments, except for the configuration in which an output value (Y3, Cb3, Cr3) is directly output from the 3D-LUT 93.

Even when an output value is directly output from the 3D-LUT 93 like the tenth embodiment, advantages similar to those of the above-described embodiments can be achieved.

Eleventh Embodiment

In an eleventh embodiment of the invention, the configuration of any of the first to tenth embodiments includes a plurality of 3D-LUTs and/or a plurality of 3D-LUT blocks, and image data resulting from the synthesis of output values from these plural components is output. In the eleventh embodiment, the synthesis of output values is executed through weighted addition employing weighting factors, and image quality is adjusted by controlling these weighting factors.

Even when, like the eleventh embodiment, color adjustment is implemented through the direct or indirect synthesis of output values from plural systems of 3D-LUTs, and the image quality of an imaging result is adjusted through control of weighting factors for the synthesis of these output values, advantages similar to those of the above-described embodiments can be achieved.

Twelfth Embodiment

In an electronic still camera according to a twelfth embodiment of the invention, a 3D-LUT is formed so that processing is allowed also for an imaging result that ranges beyond a color space defined by a format of recording in a recording medium. The twelfth embodiment has the same configuration as that of any of the above-described electronic still cameras of the first to eleventh embodiments, except that the configuration relating to the 3D-LUT is different.

The thus formed 3D-LUT executes clipping processing based on the maximum value Cmax of color difference signals Cb and Cr of image data as expressed by Equations 21 and 22 as relational expressions. Thus, when the 3D-LUT executes clipping processing for one color difference signal, the other color difference signal is also subjected to clipping processing by the 3D-LUT so that the hue is not changed. In addition, the 3D-LUT executes clipping processing for input image data that ranges beyond a color space defined by an output format so that the hue is not changed.

Equation 21

$$Cb' = \begin{cases} Cb, & \text{if } |Cb| < Cmax, \ |Cr| < Cmax \\ \frac{Cmax}{|Cr|} * Cb, & \text{if } |Cb| < |Cr| < Cmax \\ \frac{Cmax}{|Cr|} * Cb, & \text{if } |Cr| < |Cb| < Cmax \end{cases} \quad (21)$$

Equation 22

$$Cr' = \begin{cases} Cr, & \text{if } |Cb| < Cmax, \ |Cr| < Cmax \\ \frac{Cmax}{|Cr|} * Cr, & \text{if } |Cb| < |Cr| < Cmax \\ \frac{Cmax}{|Cb|} * Cr, & \text{if } |Cr| < |Cb| < Cmax \end{cases} \quad (22)$$

Figure 21:
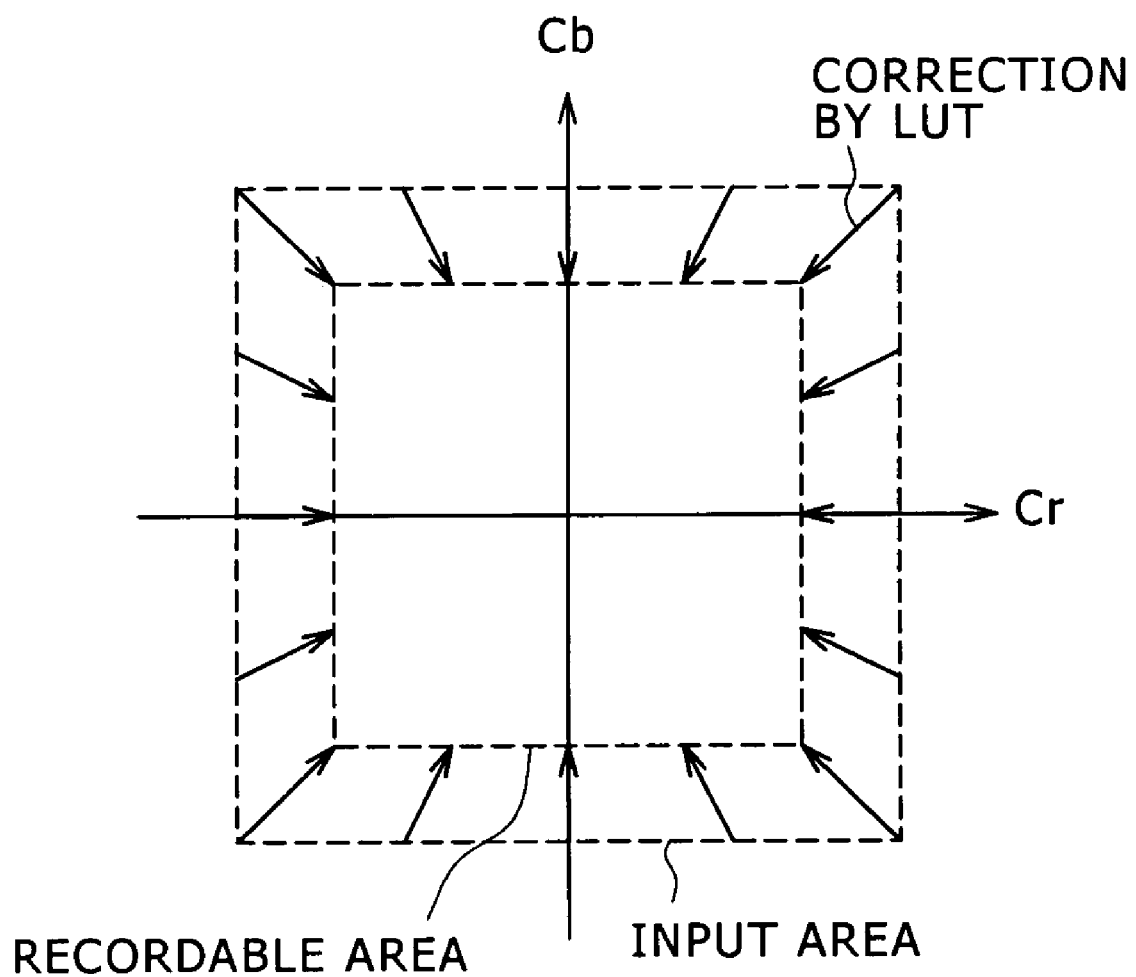
FIG. 21 is a schematic diagram for explaining the operation of an electronic still camera according to a twelfth embodiment of the invention.

Thus, in this electronic still camera, input image data is converted into data within a color space for recording in a recording medium and then is recorded in the recording medium with a change of the hue being prevented as shown in FIG. 21.

The processing for data outside a color space is also applicable to image data that is recorded in a recording medium as data defined by color signals.

Specifically, in this case, input image data of an imaging result composed of primary color signals is processed in a matrix arithmetic unit so as to be subjected to mapping in an sRGB gamut, followed by being input to a 3D-LUT block. Furthermore, RGB values of grid points obtained from an imaging result by an electronic still camera of the twelfth embodiment are converted into L*a*b* values, and correction data to be set in the 3D-LUT is produced based on the RGB values after being subjected to any gamut mapping processing, obtained in the L*a*b* space.

Figure 22:
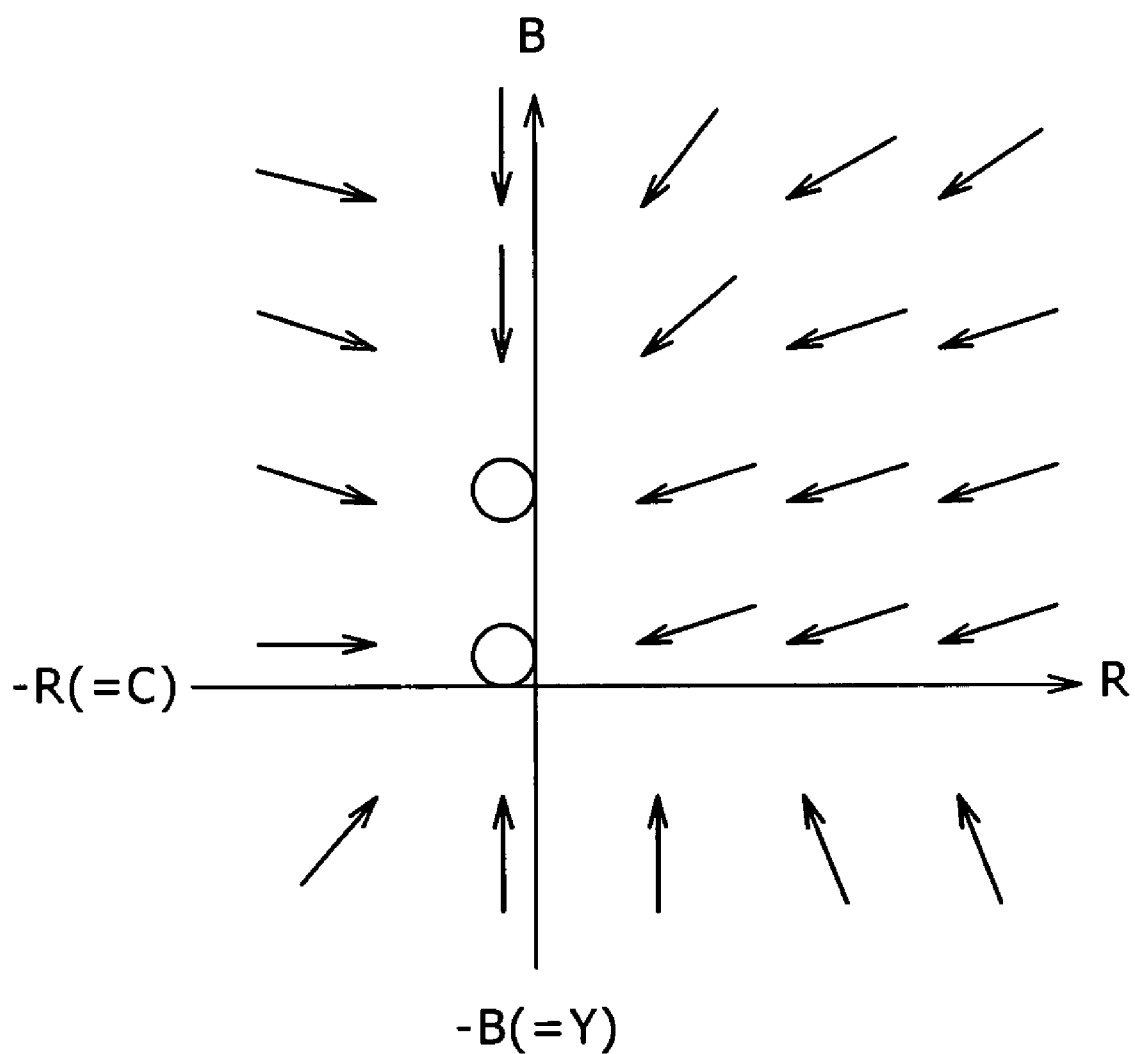
FIG. 22 is a schematic diagram for explaining the operation of the electronic still camera when image data defined by color signals is recorded in a recording medium.

Thus, as shown in FIG. 22, the sampling values of input image data are corrected so that the respective sampling points in the RGB color space are displaced toward the center of the space with a change of the hue defined by RGB values being prevented.

The processing of correcting the range of a color space for offering a compatibility with an output format can be widely applied to various ways of outputting image data. For example, this processing is also applicable to the case where output image data is limited to data within a color space that can be displayed on the liquid crystal display 2.

According to the twelfth embodiment, clipping is executed for an imaging result that ranges beyond the range of a color space defined by a recording format of recording in a recording medium so that the hue is not changed, and then the processed data is output. Thus, an advantage of effectively avoiding a change of the hue due to saturation in the post-processing can be achieved in addition to advantages similar to those of the above-described embodiments.

Thirteenth Embodiment

In an electronic still camera according to a thirteenth embodiment of the invention, three axes relating to processing in a 3D-LUT are designed to have different resolutions. The thirteenth embodiment has the same configuration as that of any of the above-described electronic still cameras of the first to twelfth embodiments, except that the configuration concerning the 3D-LUT is different.

Specifically, in the thirteenth embodiment, the numbers of grid points on the respective axes concerning the setting of the 3D-LUT are set to 2p+1, 2q+1, and 2r+1, respectively. In addition, correction data compatible with this setting is produced. Specifically, an area determiner 31 and an interpolation factor calculator 34 process input image data by arithmetic processing in accordance with Equations 23 to 25 instead of arithmetic processing of Equations 4, 5 and 7. The correction data is then produced through interpolation arithmetic processing.

Equation 23

$$g1 = \left( \left\lfloor \frac{X}{2^p} \right\rfloor \left\lfloor \frac{Y}{2^q} \right\rfloor \left\lfloor \frac{Z}{2^r} \right\rfloor \right) \quad (23)$$

Equation 24

$$p = (X \quad Y \quad Z) - \left( \left\lfloor \frac{X}{2^p} \right\rfloor \left\lfloor \frac{Y}{2^q} \right\rfloor \left\lfloor \frac{Z}{2^r} \right\rfloor \right) \cdot \begin{pmatrix} 2^p & 0 & 0 \\ 0 & 2^q & 0 \\ 0 & 0 & 2^r \end{pmatrix} \quad (24)$$

Equation 25

$$k = p \cdot \begin{pmatrix} 2^p & 0 & 0 \\ 0 & 2^q & 0 \\ 0 & 0 & 2^r \end{pmatrix}^{-1} \quad (25)$$

According to the thirteenth embodiment, three axes relating to processing by a 3D-LUT are designed to have different resolutions. Thus, the optimized resolution is assigned to each axis so that the scale of the 3D-LUT is reduced, which can reduce the capacity of memory for holding correction data. Furthermore, advantages similar to those of the above-described embodiments can be achieved.

Fourteenth Embodiment

Figure 23:
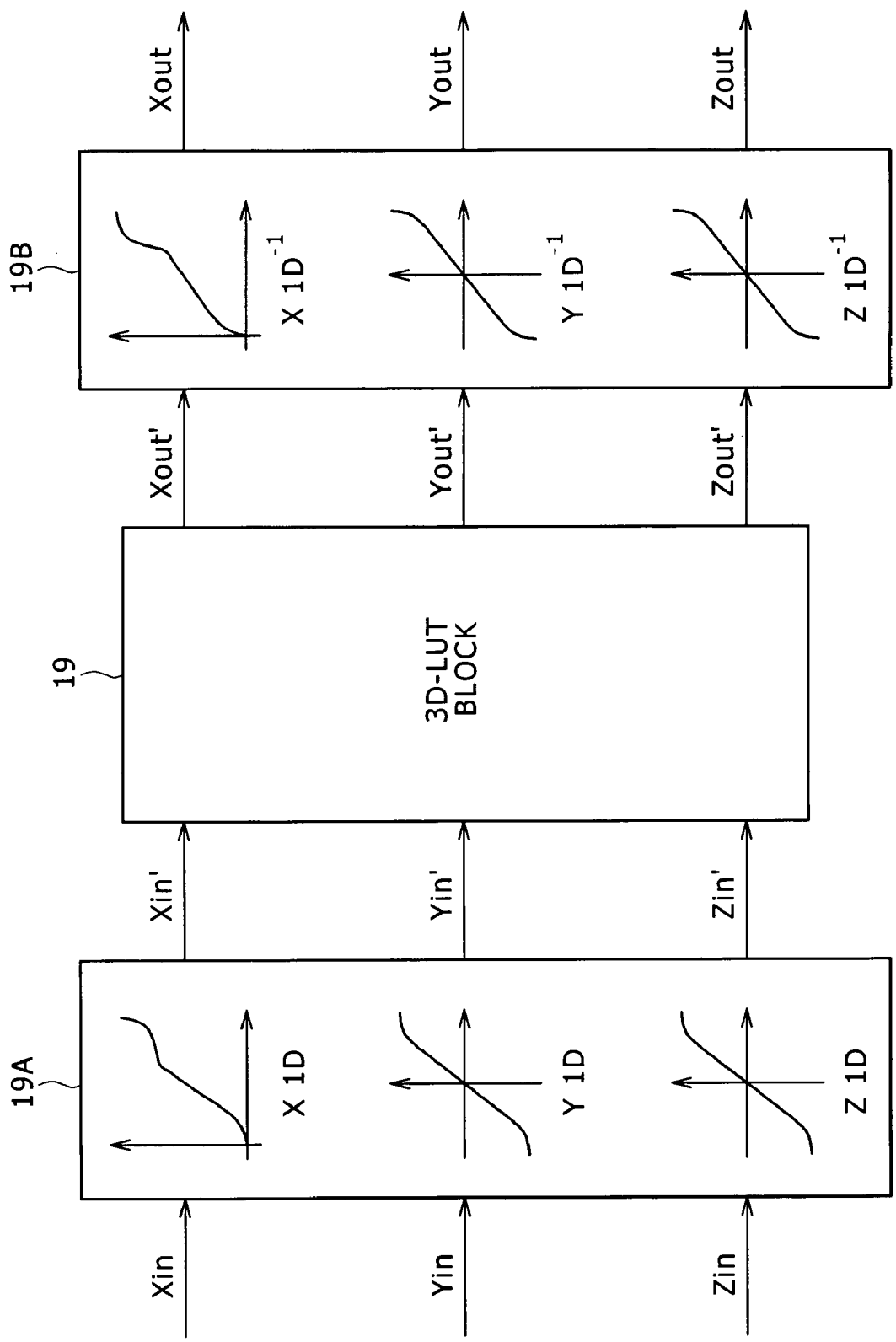
FIG. 23 is a block diagram illustrating a 3D-LUT block applied to an electronic still camera according to a fourteenth embodiment of the invention.

FIG. 23 is a block diagram illustrating a 3D-LUT block applied to an electronic still camera according to a fourteenth embodiment of the invention together with related components. The electronic still camera according to the fourteenth embodiment has the same configuration as that of any of the above-described electronic still cameras of the first to thirteenth embodiments, except that LUTs 19A and 19B for color space conversion are provided upstream and downstream of the 3D-LUT block, respectively.

In the electronic still camera, the LUTs 19A and 19B convert the color space of input image data, to thereby enhance the processing accuracy of a 3D-LUT block 19.

The LUTs 19A and 19B are designed to have input/output characteristics that are opposite to each other, which prevents an accuracy decrease in the electronic still camera due to distortion arising at the time of space conversion.

In the fourteenth embodiment, one-dimensional conversion processing is used for the conversion of a color space by the LUTs 19A and 19B. The input-side LUT 19A processes input image data with a nonlinear input/output characteristic and outputs the processed data so that the density of the grid points in the subsequent 3D-LUT block 19 is set to high in an area requiring highly-accurate image quality correction. Examples of the area requiring highly-accurate image quality correction include areas corresponding to an achromatic color and a memory color.

Figure 24:
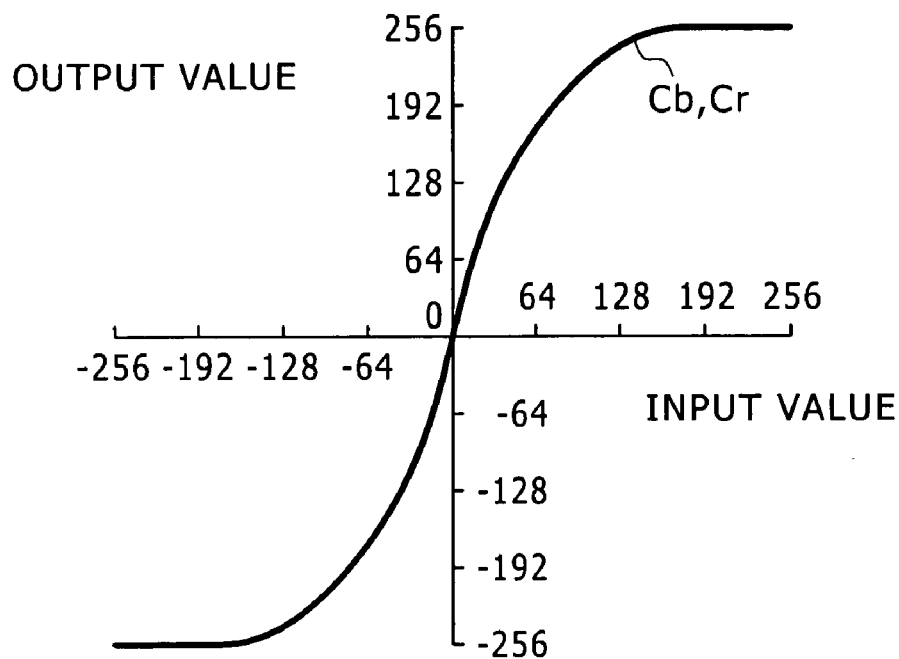
FIG. 24 is a characteristic curve diagram showing the characteristic of the input-side 3D-LUT for color difference signals in the 3D-LUT block of FIG. 23.

Specifically, when input image data defined by a luminance signal and color difference signals is to be processed, the input-side LUT 19A is designed to have an input-output characteristic regarding color difference signals shown in FIG. 24. In this characteristic, the slope of the characteristic curve is steep near the achromatic axis and the slope becomes gentler as the degree of chroma increases. The input value that yields the convergence of the curve is optionally set on the high chroma side, and thus the range of a space to be processed by the subsequent 3D-LUT block 19 is controlled. If the range of the input value is larger than that of the output value, the input value is normalized with the range of the output value so that the processing accuracy is enhanced.

Figure 25:
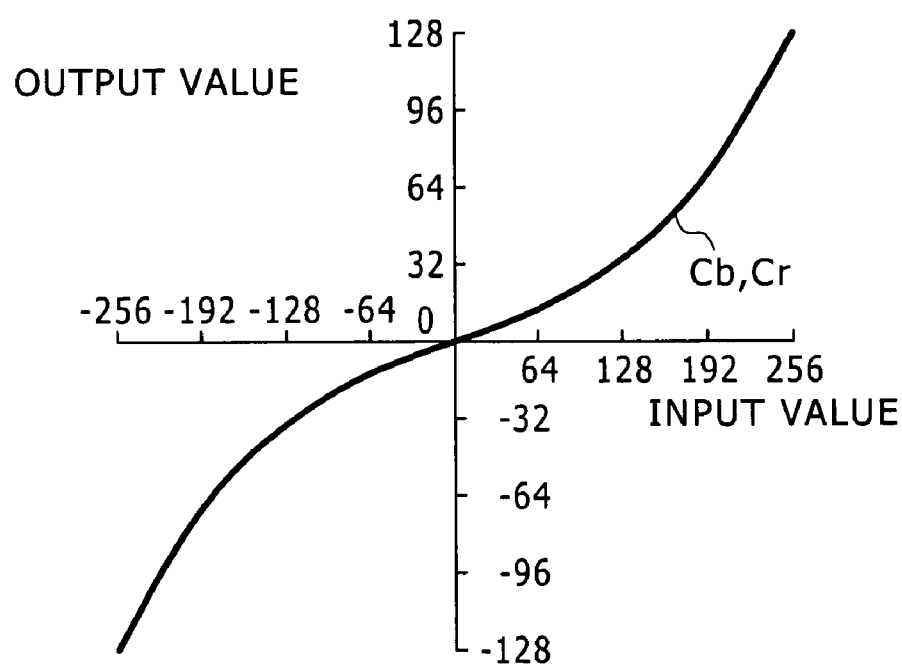
FIG. 25 is a characteristic curve diagram showing the characteristic of the output-side 3D-LUT for color difference signals in the 3D-LUT block of FIG. 23.

The characteristic shown in FIG. 25 is the reverse characteristic of the characteristic shown in FIG. 24, and is the input/output characteristic of the output-side LUT 19B regarding color difference signals.

Figure 26:
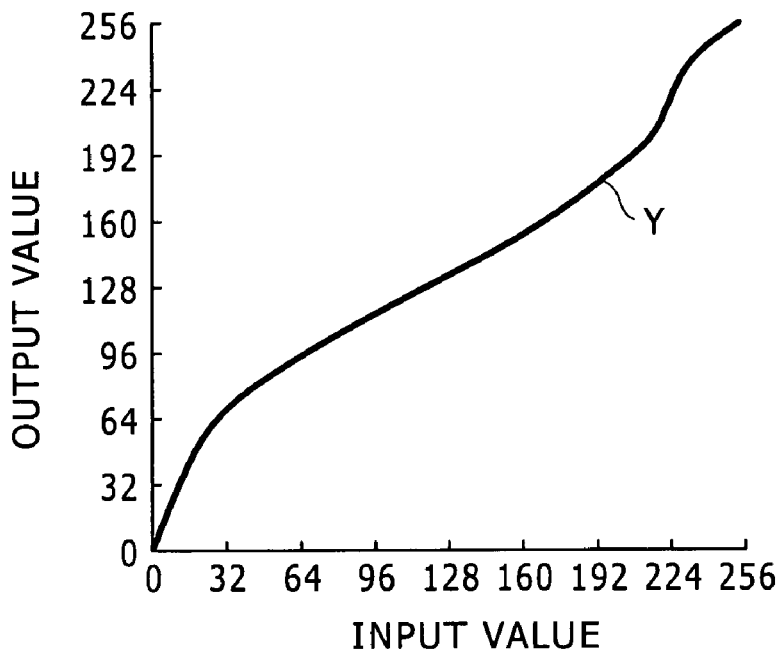
FIG. 26 is a characteristic curve diagram showing the characteristic of the input-side 3D-LUT for a luminance signal in the 3D-LUT block of FIG. 23.

In contrast, as for a luminance signal, the input-side LUT 19A is designed to have an input/output characteristic shown in FIG. 26, in which the slope of the characteristic curve is steep around important colors such as a skin color and in a high luminance area. This steep slope in a high luminance area is in order to enlarge the dynamic range.

Figure 27:
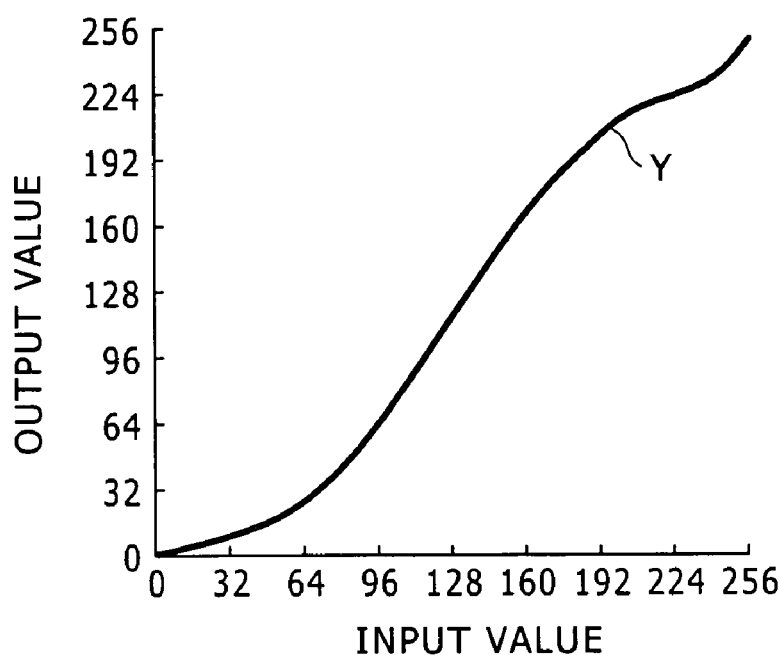
FIG. 27 is a characteristic curve diagram showing the characteristic of the output-side 3D-LUT for a luminance signal in the 3D-LUT block of FIG. 23.

The characteristic shown in FIG. 27 is the reverse characteristic of the characteristic shown in FIG. 26, and is the input/output characteristic of the output-side LUT 19B regarding a luminance signal.

According to the fourteenth embodiment, a color space is converted before and after processing by a LUT, and this color space conversion is executed through one-dimensional processing. Thus, an advantage of enhancing the accuracy of the processing by the 3D-LUT can be achieved in addition to advantages similar to those of the above-described embodiments. Specifically, fine color adjustment is carried out for achromatic colors and memory colors, for which the density of grid points is set to high, so that the accuracy of image quality correction can be enhanced.

Fifteenth Embodiment

Figure 28:
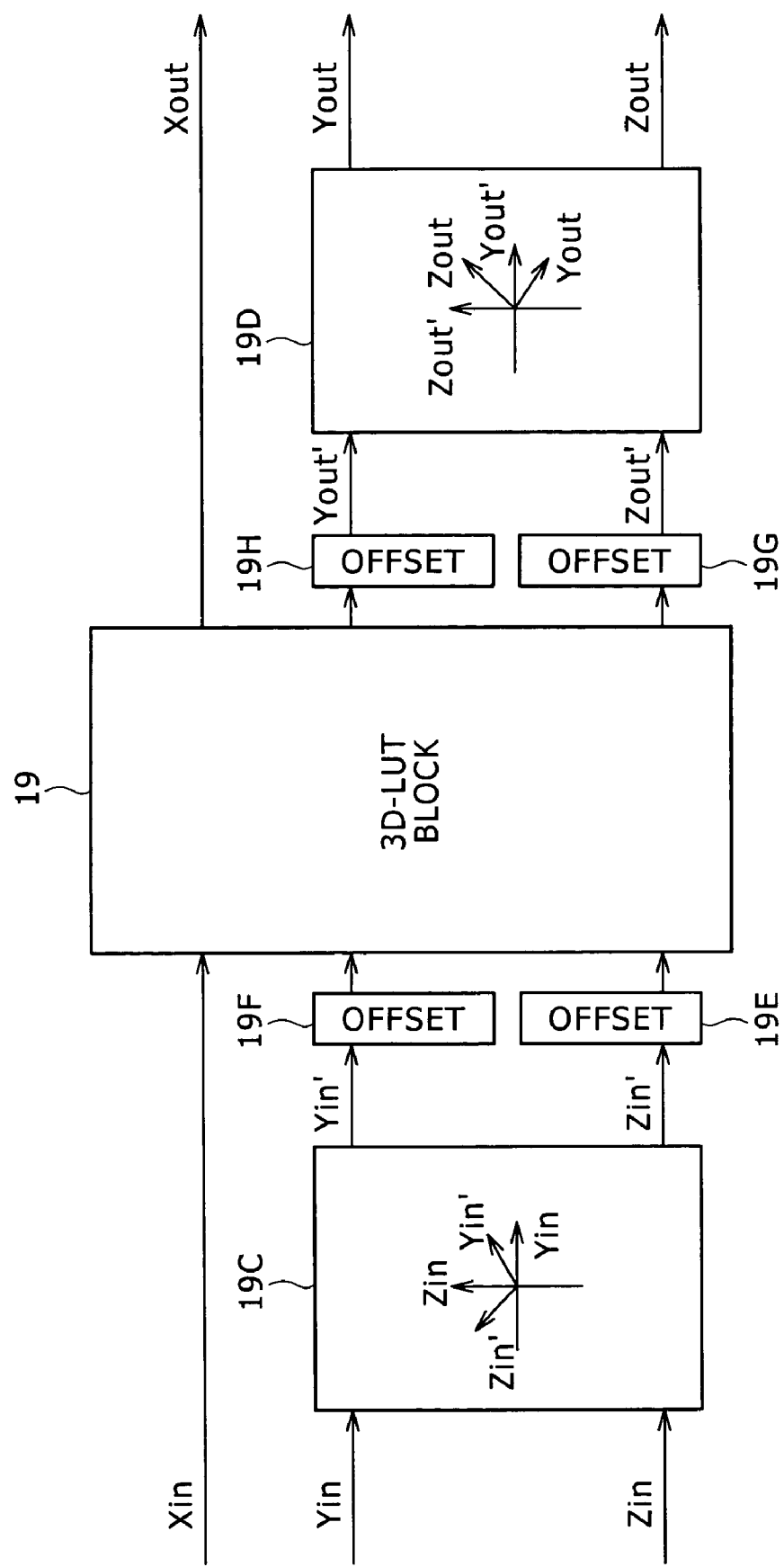
FIG. 28 is a block diagram illustrating a 3D-LUT block applied to an electronic still camera according to a fifteenth embodiment of the invention.

FIG. 28 is a block diagram illustrating, as a comparison with FIG. 23, a 3D-LUT block applied to an electronic still camera according to a fifteenth embodiment of the invention together with related components. The electronic still camera according to the fifteenth embodiment has the same configuration as that of the electronic still camera of the fourteenth embodiment, except that configurations upstream and downstream of the 3D-LUT block are different.

In the electronic still camera, provided upstream and downstream of the 3D-LUT block are LUTs 19C and 19D for two-dimensional conversion processing as color space conversion, respectively, instead of the LUTs 19A and 19B for one-dimensional color space conversion. These LUTs 19C and 19D correct color difference signals.

In addition, offset units 19E to 19H are provided at the input and output stages of the 3D-LUT block 19 in the system of color difference signals. Thus, a bias is given to image data composed of color difference signals to be input to the 3D-LUT block 19, and then this bias is removed from the image data composed of color difference signals output from the 3D-LUT block 19.

Thus, in the fifteenth embodiment, the color space of input image data is converted so that the density of grid points of the 3D-LUT block 19, regarding the hue, is set to high in an area requiring highly-accurate image quality correction. Accordingly, the accuracy of processing by the 3D-LUT block 19 is further enhanced compared with the fourteenth embodiment. In this configuration, one-dimensional color space conversion may be applied to a luminance signal.

According to the fifteenth embodiment, a color space is converted before and after processing by a LUT, and this color space conversion is executed through two-dimensional processing. Thus, an advantage of further enhancing the accuracy of the processing by the 3D-LUT can be achieved in addition to advantages similar to those of the above-described embodiments.

Sixteenth Embodiment

An electronic still camera according to a sixteenth embodiment of the invention has a configuration obtained by replacing, in the configuration shown in FIG. 23, the one-dimensional LUTs 19A and 19B by 3D-LUTs. Thus, a color space is converted before and after processing by a LUT, and this color space conversion is executed through three-dimensional processing.

In this color space conversion, image data defined by primary color signals is to be processed. In the input-side LUT, color space conversion from the RGB color space to the L*a*b* color space is executed. In the output-side LUT, the reverse conversion of the conversion in the input-side LUT, or conversion from the L*a*b* color space to the YCC color space is executed. Therefore, correction data relating to the L*a*b* color space is set in a 3D-LUT block 19, and the 3D-LUT block 19 executes processing such as chroma correction.

According to the sixteenth embodiment, a color space is converted before and after processing by a LUT, and this color space conversion is executed through three-dimensional processing. Thus, an advantage of further enhancing the accuracy of the processing by the 3D-LUT can be achieved in addition to advantages similar to those of the above-described embodiments.

Seventeenth Embodiment

Figure 29:
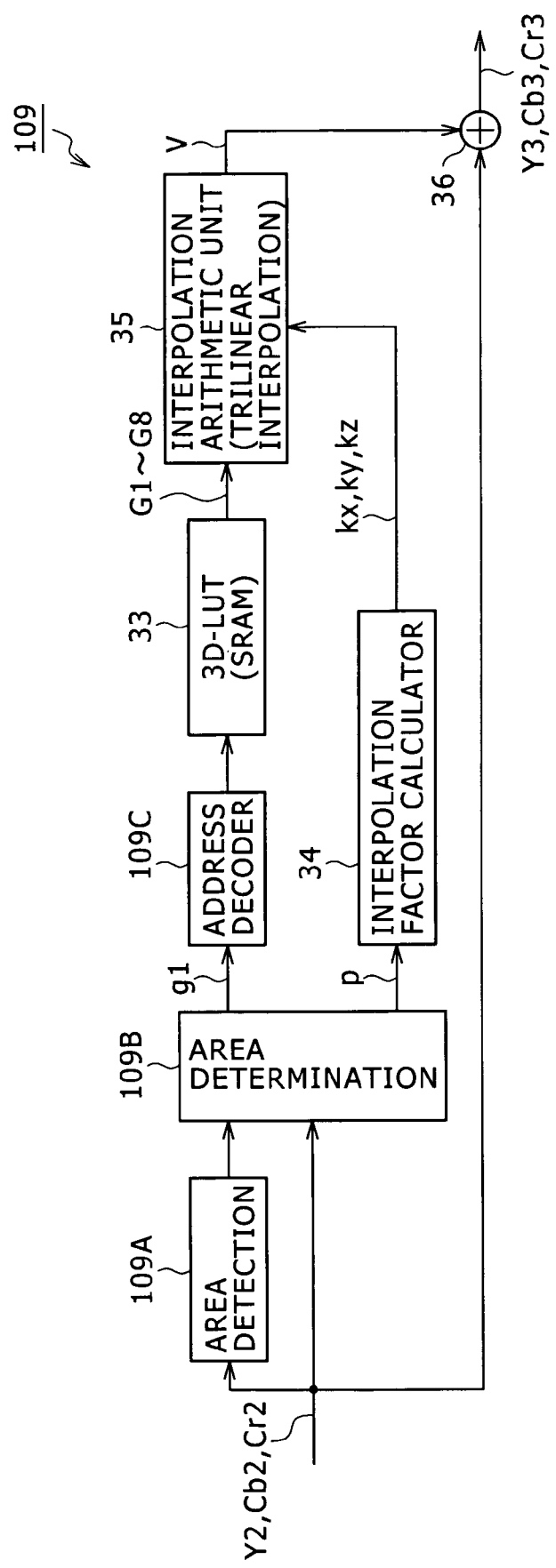
FIG. 29 is a block diagram illustrating a 3D-LUT block applied to an electronic still camera according to a seventeenth embodiment of the invention.

FIG. 29 is a block diagram illustrating, as a comparison with FIG. 1, a 3D-LUT block applied to an electronic still camera according to a seventeenth embodiment of the invention. The electronic still camera according to the seventeenth embodiment has the same configuration as that of any of the electronic still cameras of the first to sixteenth embodiments, except that this 3D-LUT block is applied.

In a 3D-LUT block 109, an area detector 109A, an area determiner 109B, and an address decoder 109C are provided instead of the area determiner 31 and the address decoder 32. The area detector 109A determines the sampling values of input image data (Y2, Cb2, Cr2), and thus detects whether or not the sampling values of the input image data (Y2, Cb2, Cr2) exist in specific areas of plural areas set in the color space defined by the input image data (Y2, Cb2, Cr2).

The specific areas correspond to areas requiring highly-accurate image quality correction, and include areas near memory colors such as a skin color and green.

The area determiner 109B detects a reference grid point g1 and an offset p for the input image data (Y2, Cb2, Cr2) based on the determination as to the sampling values of the input image data. In this processing, the area determiner 109B detects and outputs the reference grid point g1 and the offset p only when the area detector 109A has detected the existence of the sampling values of the input image data (Y2, Cb2, Cr2) in the specific areas of the color space.

In correspondence with the operations of the area detector 109A and the area determiner 109B, the color space pertaining to correction data for the 3D-LUT 33 is divided according to the area segmentation by the area detector 109A, and only the correction data corresponding to the specific areas concerning the detection by the area detector 109A is recorded in the 3D-LUT 33. Since only the correction data corresponding to the specific areas is thus recorded, the recording of high resolution correction data is allowed correspondingly. Thus, the 3D-LUT block 109 produces a correction vector V and corrects the image quality of input image data only for the specific areas corresponding to memory colors. Therefore, the seventeenth embodiment allows further enhancement of the accuracy of image quality correction.

Furthermore, the conversion parameters in the address decoder 109C as well as the correction data for the 3D-LUT 33 are switched depending on an image quality correction mode. Thus, assignment to a color space is switched on each image quality correction mode basis, which also further enhances the accuracy of image quality correction. For this switching of assignment to a color space on each image quality correction mode basis, the number of areas into which the color space of input image data is divided may be switched through the switching of areas detected by the area detector 109A.

According to the seventeenth embodiment, a color space relating to a 3D-LUT is divided into a plurality of areas, and processing by the 3D-LUT is switched on each area basis. Thus, adjustment accuracy for specific areas corresponding to memory colors and the like can be enhanced. Therefore, an advantage of more finely adjusting image quality can be achieved in addition to advantages similar to those of the above-described embodiments.

Eighteenth Embodiment

Figure 30:
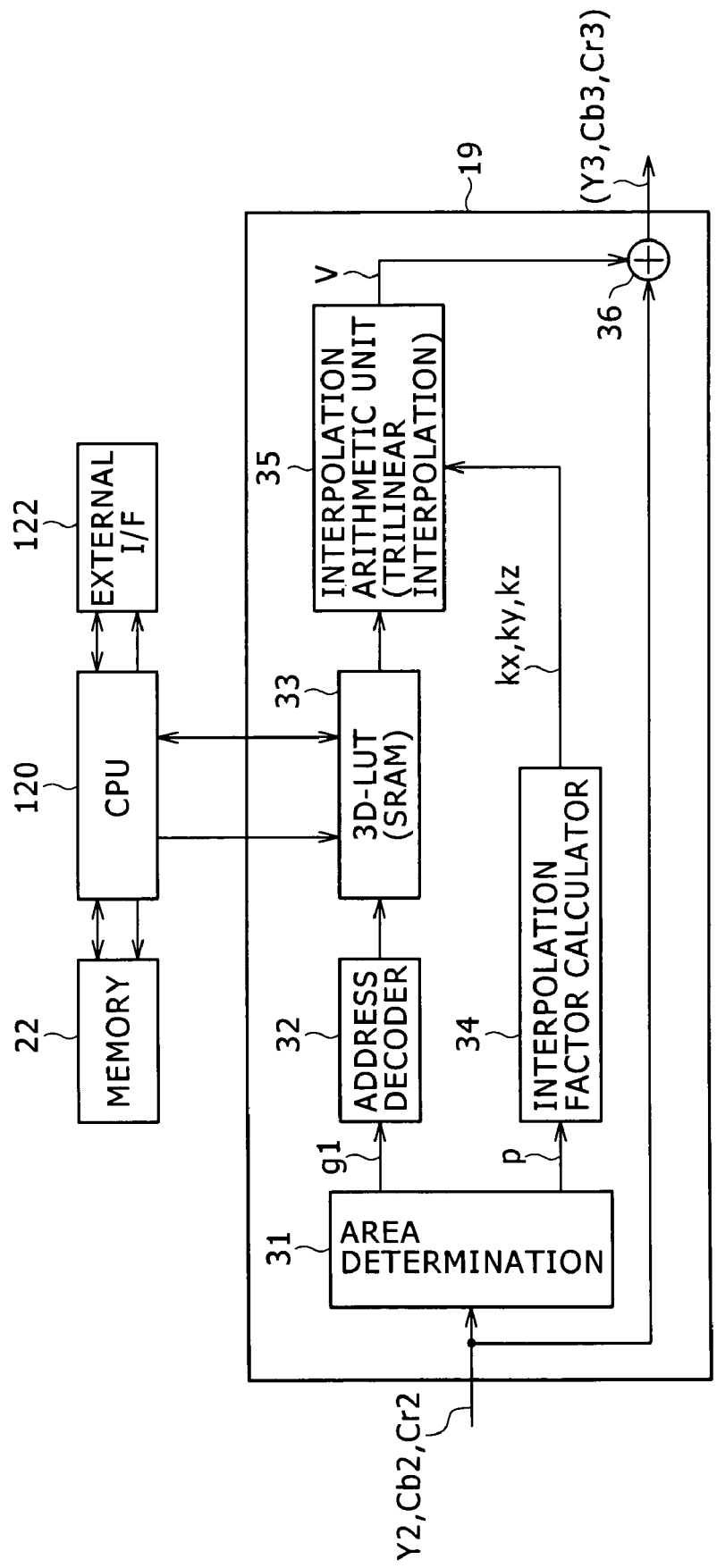
FIG. 30 is a block diagram illustrating a 3D-LUT block applied to an electronic still camera according to an eighteenth embodiment of the invention.
Figure 31:
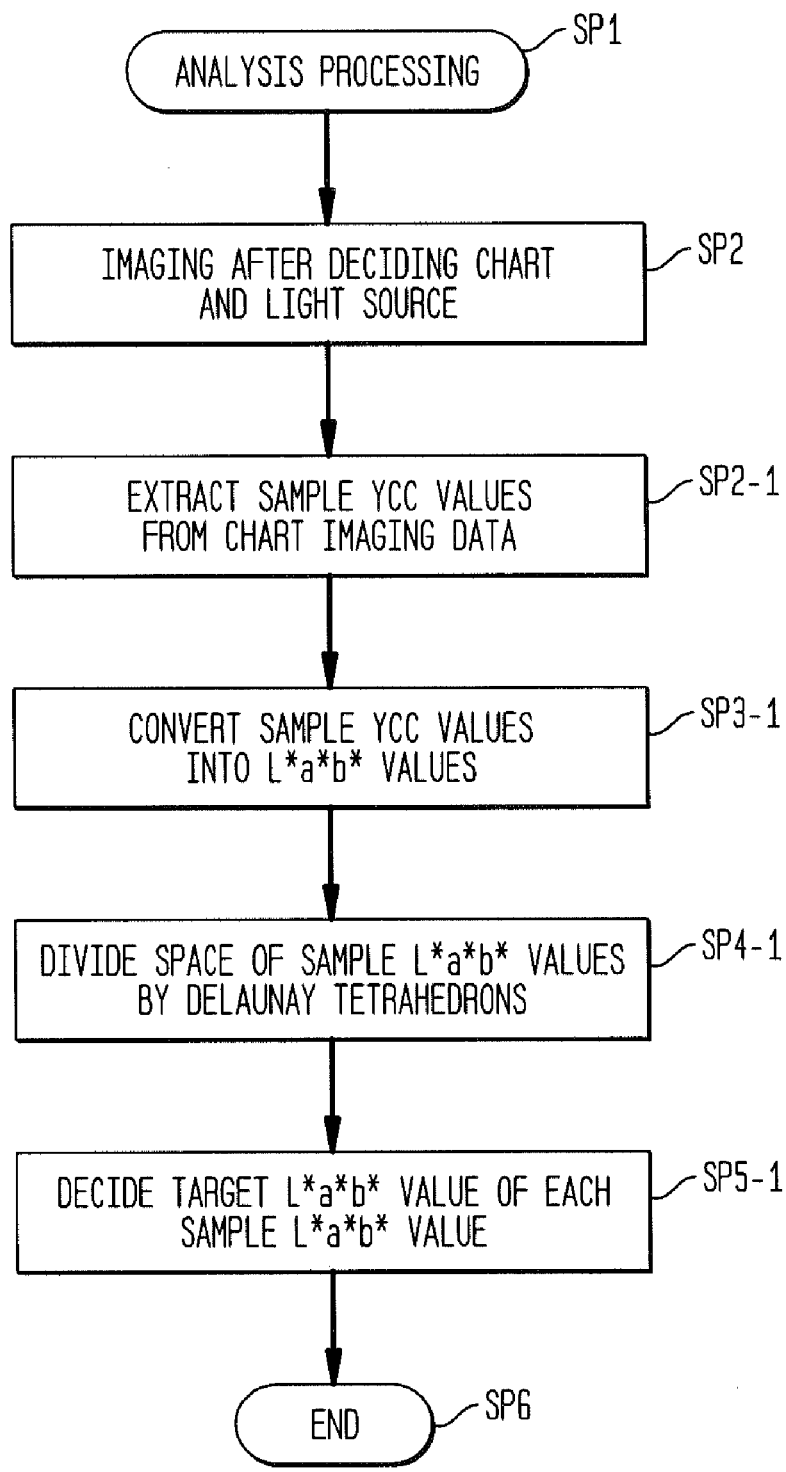
FIG. 31 is a flowchart showing analysis processing for creating correction data on the L*a*b* color space.
Figure 32:
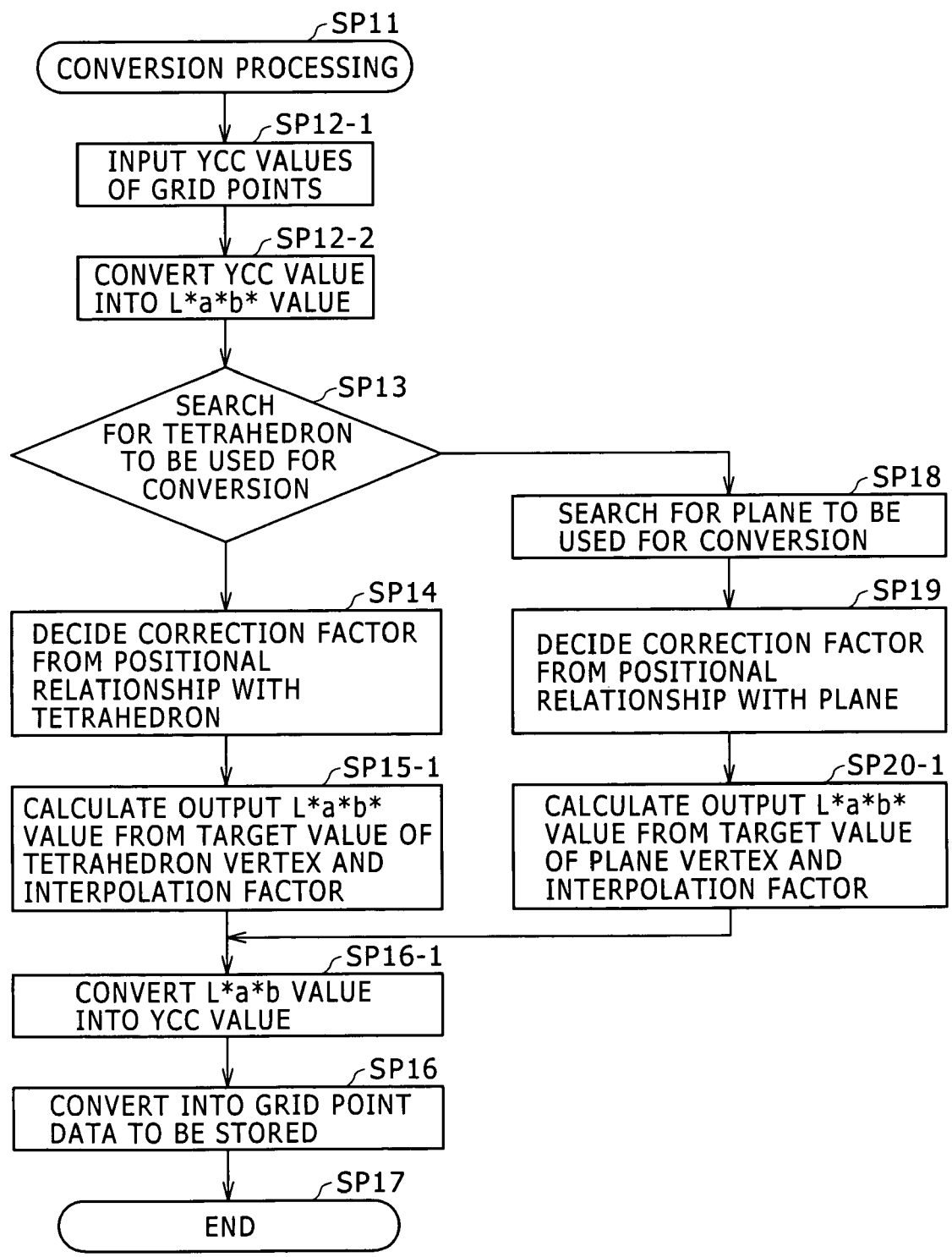
FIG. 32 is a flowchart showing conversion processing for creating correction data on the L*a*b* color space.
Figure 33:
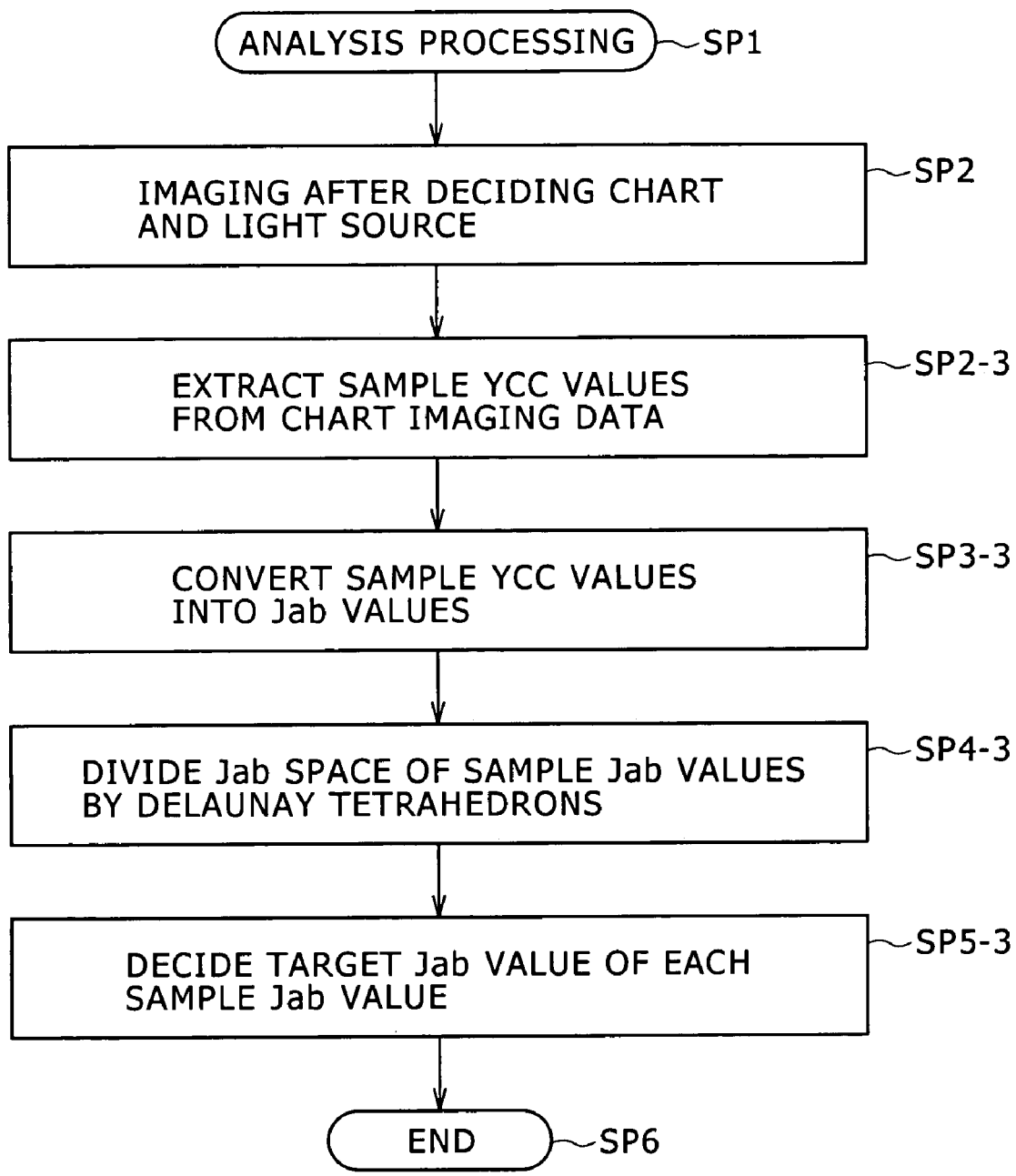
FIG. 33 is a flowchart showing analysis processing for creating correction data on the CIECAM02 Jab color space.
Figure 34:
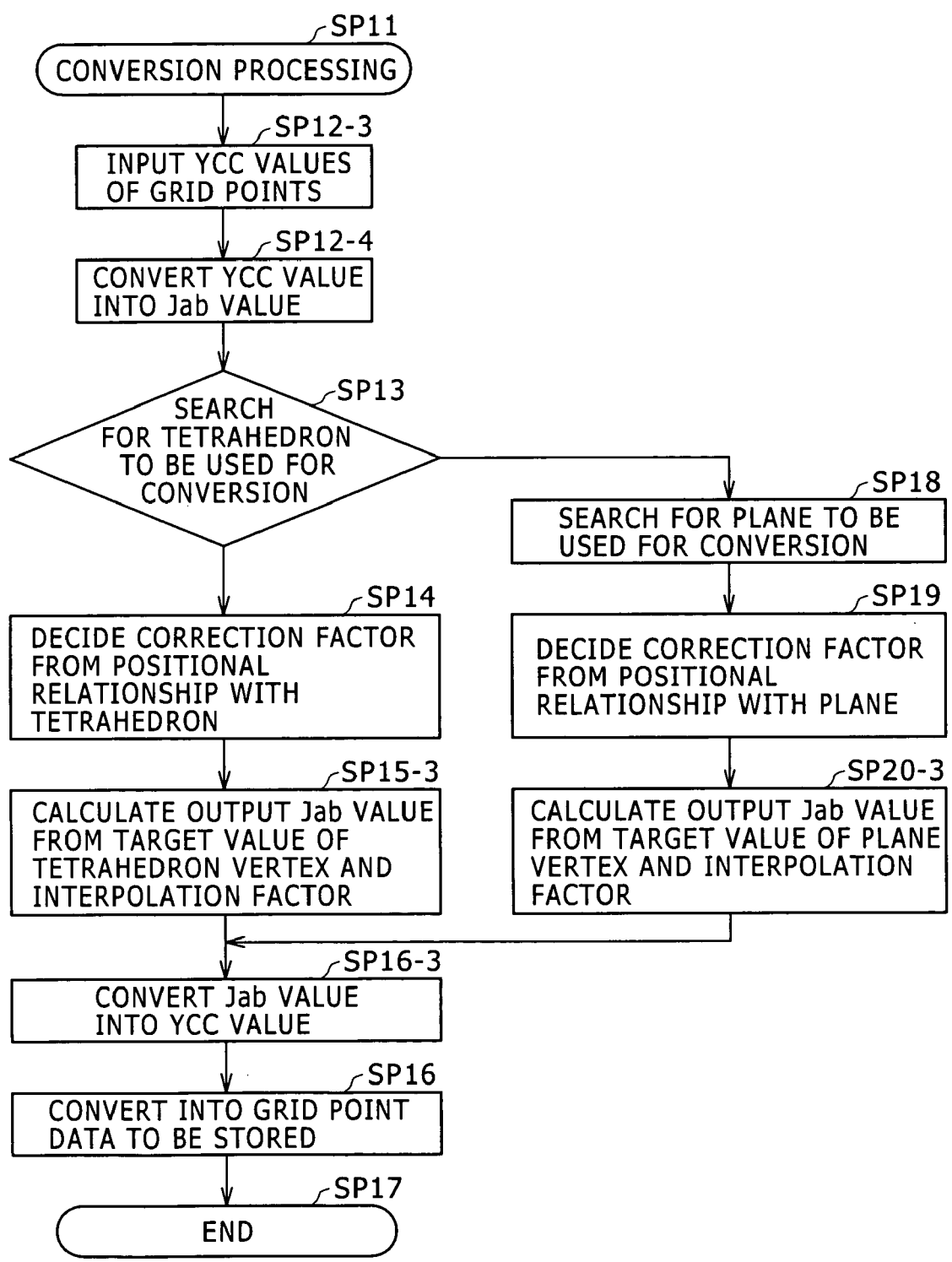
FIG. 34 is a flowchart showing conversion processing for creating correction data on the CIECAM02 Jab color space.

FIG. 30 is a block diagram illustrating, as a comparison with FIG. 1, the peripheral configuration of a 3D-LUT block applied to an electronic still camera according to an eighteenth embodiment of the invention. The electronic still camera according to the eighteenth embodiment has the same configuration as that of any of the electronic still cameras of the first to seventeenth embodiments, except that the peripheral configuration of a 3D-LUT block 19 is different.

In the electronic still camera 1, correction data for the 3D-LUT 33 produced by another imaging device such as a personal computer is obtained via a recording medium such as a memory card coupled to an external interface (I/F) 122, and is recorded in the memory 22. The correction data obtained via the external I/F 122 is set in the 3D-LUT 33 in response to operation by a user. Thus, the electronic still camera 1 can duplicate conditions of image quality correction made by another device.

Furthermore, vice versa, correction data recorded in the memory 22 is recorded in a recording medium via the external I/F 122 so that the correction data can be edited in a computer or the like and can be set in another imaging device.

According to the eighteenth embodiment, correction data by another imaging device is obtained via an external I/F and is set in a 3D-LUT, which allows the duplication of conditions of image quality correction made by the another device. Thus, an advantage of improving usability for a user can be achieved in addition to advantages similar to those of the above-described embodiments.

Nineteenth Embodiment

An electronic still camera according to a nineteenth embodiment of the invention acquires an imaging result recorded by another imaging device via e.g. a memory card, and creates correction data to be set in a 3D-LUT from this imaging result. Therefore, this electronic still camera performs the emulation of image quality correction processing by another imaging device to thereby enhance usability for a user.

Specifically, the electronic still camera according to the nineteenth embodiment has the same configuration as that of any of the electronic still cameras of the first to seventeenth embodiments, except that a controller and the like for controlling the entire operation can execute processing for this emulation.

The electronic still camera and another imaging device perform the imaging of the same color chart under the same imaging conditions, and then the controller in the electronic still camera executes the processing procedures of FIGS. 9 and 10 with use of these two imaging results to thereby create correction data. In this processing, the imaging result by another imaging device is set as the target colors of the respective grid points.

Thus, this electronic still camera produces correction data for the 3D-LUT so that image quality correction implemented by another imaging device can be duplicated.

According to the nineteenth embodiment, an imaging result recorded by another imaging device is obtained and then correction data to be set in a 3D-LUT is creased, which allows emulation of image quality correction processing in this imaging device. Thus, an advantage of improving usability for a user can be achieved in addition to advantages similar to those of the above-described embodiments.

Twentieth Embodiment

In the above-described embodiments, correction data for a 3D-LUT is produced based on the YCC color space. However, the present invention is not limited to the embodiments, but correction data may be designed on the L*a*b* color space or the CIECAM02 Jab color space. FIGS. 31 to 34 are flowcharts, as comparisons with FIGS. 9 and 10, showing processing procedures for creating correction data on the L*a*b* color space and the CIECAM02 Jab color space. In these processing procedures, sampling values are converted and processed according to the color space to be used for the creation of correction data as shown in the flowcharts, in which numerals of processing steps are associated with those of the corresponding steps in FIGS. 9 and 10. Thus, correction data can be created easily and surely similarly to the above-described embodiments.

In the above-described embodiments, an imaging result as a still image is obtained by an electronic still camera. However, the present invention is not limited to the embodiments, but can also be widely applied to acquisition of an imaging result as a moving image by use of an electronic still camera or a video camera. In the acquisition of an imaging result as a moving image, the condition of image quality correction may be changed along the time axis by gradually changing weighting factors relating to a processing result by a 3D-LUT, which have been described above for the eights and ninth embodiments and so forth.

In the above-described embodiments, an imaging result is processed in real time. However, the present invention is not limited to the embodiments. An imaging result may be recorded in a recording medium as so-called RAW data, and later may be subjected to image quality adjustment employing processing corresponding to any of the above-described embodiments. In the recording of RAW data, imaging conditions that can be detected only at the time of obtaining an imaging result may also be recorded and held with the RAW data. Thereafter, the RAW data may be subjected to processing similar to that of any of the third and fourth embodiments.

In the above-described embodiments, merely an imaging result of which image quality has been corrected is recorded in a recorded medium. However, the present invention is not limited to the embodiments. Information specifying the correction data used for the image quality correction may be recorded together with the corrected imaging result, and the information may be utilized for subsequent processing.

In the above-described embodiments, the present invention is applied to an electronic still camera. However, the invention is not limited to the embodiments, but can also be widely applied to other various imaging devices such as video cameras and camera-equipped cellular phones.

The invention claimed is:

1. An imaging device, comprising:
an imaging element that outputs an imaging result of an optical image formed on an imaging plane; and
an image processor that implements color adjustment for the imaging result using a three-dimensional look-up table;
wherein the image processor includes:
an input-side color space converter that converts a color space of the imaging result from the imaging element, and outputs a resultant imaging result as data to be processed using the three-dimensional look-up table, and
an output-side color space converter that converts, using a reverse characteristic of a characteristic of the input-side color space converter, a color space of a processing result using the three-dimensional look-up table, and outputs a resultant imaging result.

2. The imaging device according to claim 1, further comprising:
a memory that stores a plurality of kinds of correction data to be set in the three-dimensional look-up table; and
a controller that selects correction data from the plurality of kinds of correction data stored in the memory, and sets the selected correction data in the three-dimensional look-up table.

3. The imaging device according to claim 2, further comprising a display unit that displays the imaging result, wherein the controller causes the display unit to display a menu including a plurality of kinds of items corresponding to the plurality of kinds of correction data, and accepts selection of an item by a user, and correction data that corresponds to the item selected by the user is set in the three-dimensional look-up table.

4. The imaging device according to claim 2, wherein the controller selects the correction data to be set in the three-dimensional look-up table in accordance with an imaging condition that can be detected at the time of acquisition of the imaging result by the imaging element.

5. The imaging device according to claim 1, further comprising:
a memory that stores a plurality of kinds of correction data to be set in the three-dimensional look-up table; and
a controller that creates correction data through interpolation arithmetic processing with use of the plurality of kinds of correction data stored in the memory, and sets the created correction data in the three-dimensional look-up table.

6. The imaging device according to claim 5, further comprising a display unit that displays the imaging result, wherein the controller causes the display unit to display a menu including a plurality of kinds of items corresponding to the plurality of kinds of correction data, and accepts selection of a first item and a second item, the controller sets on the display unit a setting screen for an intermediate tone of the selected first and second items, and accepts setting of a weighting factor for the intermediate tone, and correction data produced through interpolation arithmetic processing with use of the weighting factor and correction data corresponding to the first and second items is set in the three-dimensional look-up table as the created correction data.

7. The imaging device according to claim 5, wherein the controller sets an interpolation factor to be used for the interpolation arithmetic processing in accordance with an imaging condition that can be detected at the time of acquisition of the imaging result by the imaging element.

8. The imaging device according to claim 1, further comprising a controller that sets correction data in the three-dimensional look-up table after weighting the correction data with a weighting factor, wherein the controller adjusts image quality of the imaging result by controlling the weighting factor.

9. The imaging device according to claim 8, further comprising a display unit that displays the imaging result, wherein the controller causes the display unit to display a setting screen, and accepts setting of the weighting factor by input through the setting screen.

10. The imaging device according to claim 8, wherein the controller sets the weighting factor in accordance with an imaging condition that can be detected only at the time of acquisition of the imaging result by the imaging element.

11. The imaging device according to claim 1, further comprising a controller that adjusts image quality of the imaging result, wherein the image processor weights an output value from the three-dimensional look-up table with a weighting factor and outputs the weighted output value, and the controller controls the weighting factor to thereby adjust the image quality of the imaging result.

12. The imaging device according to claim 11, further comprising a display unit that displays the imaging result, wherein the controller causes the display unit to display a setting screen, and accepts setting of the weighting factor by input through the setting screen.

13. The imaging device according to claim 11, wherein the controller sets the weighting factor in accordance with an imaging condition that can be detected only at the time of acquisition of the imaging result by the imaging element.

14. The imaging device according to claim 1, further comprising a controller that adjusts image quality of the imaging result, wherein the three-dimensional look-up table is a plurality of three-dimensional look-up tables, the image processor synthesizes output values from the plurality of three-dimensional look-up tables to thereby implement the color adjustment, and the controller controls a weighting factor for synthesis of the output values to thereby adjust the image quality of the imaging result.

15. The imaging device according to claim 14, further comprising a display unit that displays the imaging result, wherein the controller causes the display unit to display a setting screen, and accepts setting of the weighting factor by input through the setting screen.

16. The imaging device according to claim 14, wherein the controller sets the weighting factor in accordance with an imaging condition that can be detected only at the time of acquisition of the imaging result by the imaging element.

17. The imaging device according to claim 1, wherein the image processor implements clipping, without changing a hue, for the imaging result that ranges beyond a range of a color space defined by a recording format of recording in the recording medium, and outputs a resultant imaging result, the clipping depending on setting of correction data set in the three-dimensional look-up table.

18. The imaging device according to claim 1, wherein the three-dimensional look-up table is designed so that respective axes have different resolutions.

19. The imaging device according to claim 1, wherein the image processor divides a color space of an imaging result from the imaging element into a plurality of areas, and determines which area the imaging result belongs to, and the image processor switches access to the three-dimensional look-up table depending on a determination result.

20. The imaging device according to claim 1, further comprising a controller that sets correction data in the three-dimensional look-up table, wherein the controller creates the correction data by setting an imaging result obtained by another imaging device as a target value, and sets the created correction data in the three-dimensional look-up table.

21. The imaging device according to claim 1, wherein the input-side and output-side color space converters are one-dimensional look-up tables.

22. The imaging device according to claim 1, wherein the input-side color space converter processes the input image data using a non-linear input/output characteristic.

23. The imaging device according to claim 1, wherein for color difference signals, a slope of the characteristic of the input-side color space converter is steeper near an achromatic axis and is less steep as the degree of chroma increases.

24. The imaging device according to claim 1, wherein for a luminance signal, a slope of the characteristic of the input-side color space converter is steeper in high luminance regions.

25. A method of processing an imaging result in an imaging device, the method comprising:
outputting an imaging result of an optical image formed on an imaging plane;
implementing color adjustment for the imaging result using a three-dimensional look-up table, including:
converting a color space of the imaging result,
outputting a resultant imaging result as data to be processed using the three-dimensional look-up table,
converting, using a reverse characteristic of a characteristic used while converting the color space of the imaging result, a color space of a processing result using the three-dimensional look-up table, and
outputting a resultant imaging result.

26. An imaging device, comprising:
an imaging element that outputs an imaging result of an optical image formed on an imaging plane; and
an image processor that implements color adjustment for the imaging result using a three-dimensional look-up table;
wherein the image processor includes:
an input-side color space converter that converts a color space of the imaging result from the imaging element, and outputs a resultant imaging result as data to be processed using the three-dimensional look-up table so that a density of grid points in the three-dimensional look-up table is high in an area requiring highly-accurate image quality correction, and
an output-side color space converter that converts, using a reverse characteristic of a characteristic of the input-side color space converter, a color space of a processing result using the three-dimensional look-up table, and outputs a resultant imaging result.

27. The imaging device according to claim 26, wherein the area requiring highly-accurate image correction is an area corresponding to an achromatic color.

28. The imaging device according to claim 26, wherein the area requiring highly-accurate image correction is an area corresponding to a memory color.

29. The imaging device according to claim 26, wherein for color difference signals of the imaging result, the characteristic of the input-side color space converter has a steeper slope near the achromatic axis and has a gentler slope as the degree of chroma increases.

30. The imaging device according to claim 26, wherein for a luminance signal of the imaging result, the characteristic of the input-side color space converter has a steeper slope around important colors.

31. A method of processing an imaging result in an imaging device, the method comprising:
- outputting an imaging result of an optical image formed on an imaging plane;
- implementing color adjustment for the imaging result using a three-dimensional look-up table, including:
  - converting a color space of the imaging result, and outputting a resultant imaging result as data to be processed using the three-dimensional look-up table so that a density of grid points in the three-dimensional look-up table is high in an area requiring highly-accurate image quality correction,
- converting, using a reverse characteristic of a characteristic used while converting the color space of the imaging result, a color space of a processing result using the three-dimensional look-up table, and
- outputting a resultant imaging result.

* * * * *